INVENTORS
ROBERT ADRIAAN GRIJSEELS
HENDRIKUS HERMANUS TONEN

ATTORNEYS

United States Patent Office 3,230,508
Patented Jan. 18, 1966

3,230,508
SYSTEM FOR THE SIMULTANEOUS STEP-BY-STEP SETTING OF A NUMBER OF MOVABLE ELEMENTS
Robert Adriaan Grijseels and Hendrikus Hermanus Tonen, Hengelo, Overijsel, Netherlands, assignors to N.V. Hollandse Signaalapparaten, Hengelo, Netherlands, a firm of the Netherlands
Filed Oct. 3, 1961, Ser. No. 143,026
Claims priority, application Great Britain, Oct. 4, 1960, 33,996/60
5 Claims. (Cl. 340—154)

The invention relates to a system for the simultaneous step-by-step setting of a number of movable elements, each of which is provided with a signalling-back device that signals back the position reached by the element cooperating with it by closing or opening of signalling-back contacts in one or more circuits in a group of signalling-back circuits.

Such a system can for instance be used for setting display boards possessing one or more groups of settable display units which are capable of showing letters and figures. Such a display board may be used for stock quotations or similar data. The system can also be used for setting mechanical storage devices and other settable devices.

According to the invention the system is built in such a way that all the movable devices which are to be set, insofar as they have not yet reached their eventual positions, are stepped forward by means of electrical or mechanical stepping pulses derived from a common source. The motion through a full step for all elements takes place each time in a stepping interval which is common for all elements, while all the elements remain at rest during the rest intervals occurring between two successive stepping intervals. In each rest interval during the setting operation, a programming arrangement controls a magnetic storage system to supply successively indications in an electric code of the eventual settings of elements to be set, to a comparison circuit. These code indications are stored in the storage system. The programming arrangement selects, by way of programming connections, an element when its eventual setting is supplied by the magnetic storage system. The selection is effected by permitting the signalling back of the position of this element to the comparison circuit and by establishing a control connection between the control device controlling the supply of stepping pulses to the selected element and the comparison circuit. By means of this connection the comparison circuit controls the control device to permit the supply of the next stepping pulse to the element if the comparison circuit does not establish equivalence of the code indications received from both sides, and to suppress the influence of the next stepping pulse on the element if equivalence is established.

In a very effective embodiment of the invention each movable element is driven by its own stepping electromagnet. The control device consists of an electronic switch in the pulse supply circuit of the stepping magnet controlled by a bi-stable trigger circuit. The trigger circuit is triggered by the programming circuits of the storage device into the condition in which it controls the switch so that it passes the stepping pulses from the common source to the stepping magnet before the start of the first comparison in a complete cycle of comparisons. The settings of all elements to be set are compared in such complete cycle with the code indications received from the storage. The trigger circuit controlling the pulse supply to the stepping magnet of an element is triggered back into the condition in which it controls the switch to suppress the stepping pulse supply to the stepping magnet by way of an "and" circuit by means of the combined influence of the voltage supplied by the comparison circuit when establishing equivalence and the voltage applied by the programming circuit in the storage system when selecting said element.

The systems may be used to set the elements of one single group as well as the elements of a group selected from a number of groups. In an effective system of the latter type the stepping pulse circuit for the stepping magnets of the corresponding movable elements of the various groups of elements is controlled by a single control circuit. One end of the windings of all stepping magnets of these elements is connected to the pulse circuit, while the other ends of the windings of the stepping magnets of the movable elements belonging to the same group can be connected to one pole of the common pulse source by way of a switching device used for the purpose of selecting a group. One side of the corresponding signalling-back contacts of the corresponding movable elements of different groups is connected by means of multiple wires, and the other side of all signalling back contacts of all elements belonging to the same group can be connected to a potential suitable for signalling-back by a switching device selecting a group. The multiple wires connected to the signalling-back contacts of the corresponding elements in different groups are connected by way of "and" circuits or gate circuits to circuits in a connection to the comparison system when the storage system, while selecting the element in the group, applies a selection potential to all "and" or gate circuits of the said multiple.

The time intervals available for the control of the setting of the elements between the successive stepping pulses are very short so that only electronic apparatus is capable of effecting it. No such restrictions apply to the selection of a group to be set simultaneoulsy out of a number of such groups. For this purpose normal electro-magnetic relays, which, as a rule, operate even quicker than stepping magnets are sufficient. Systems of the type described, however, operate as a rule in synchronism with a source of synchronizing pulses and the frequency of these pulses is adapted to the high speed of operation of the electronic apparatus, so that it is far too high for controlling the excitation of electro-magnetic relays. Therefore, in an effective embodiment of the invention, the operation of the group selection relays is controlled by a separate source of slow synchronizing pulses.

According to the invention the selection of the group of elements to be set can be controlled by information stored in the storage system. Under these circumstances it would be possible for a wrong group to be selected as the result of the excitation of wrong selection devices or the wrong selection relay. In order to prevent the setting of such a wrongly selected group, according to the invention, the system can be built in such a way that each selection device or selection relay in the condition in which it effects the selection is controlled by a control voltage applied to a programming conductor by the storage system. The device or relay supplies the code indication, by means of which it is to be selected, to the comparison circuit at the same moment at which the storage system, after the selection, again supplies the code controlling the selection to the comparison circuit. The comparison circuit during this checking operation, is connected to a device capable of interrupting the operation of the system and, in the case of non-equivalence, controls this device to effect such an interruption.

In many cases the elements to be set signal back the positions reached in a shifting or chaincode, while the eventual settings are stored in the storage system in some well known other code, such as a teleprinter code, which is not subjected to the restrictions of the chaincode. In these cases, according to the invention, a code converter is inserted either in the connection between the storage system and the comparison circuit or in the connection through which the signalling-back is effected.

It is desirable for the setting operation to be interrupted as soon as possible after all elements have reached their eventual positions. According to the invention, for this purpose the system is built so as to interrupt the setting operation as soon as, during a cycle in which the positions of all elements of the group to be set are compared with the registrations in the storage system, non-equivalence has not been established in any case.

In a system according to the invention a ring or magnetic core matrix storage can be used in the storage system. In this case, preferably, each line in the matrix stores the code for the eventual setting of one element. A programming system, such as a ring counter, successively selects the lines of the matrix and applies control voltages to the various programming wires. A magnetic drum storage may, however, also be used.

The invention will now be elucidated by describing the circuits of three display boards having the display units which are controlled according to the invention. In the description reference will be made to the drawings, in which;

FIG. 1 shows a display unit used in the boards;

FIGS. 2, 3, 4 and 5 placed side by side in this order show the control circuits of the board;

In the embodiments of the invention described below various components and circuits are used which are well-known in the art of building computer systems and described e.g., in the book by R. K. Richards: "Digital computer components and circuits" (D. van Norstrand Company, Inc.). Said components and circuits will now be enumerated.

Figure 4:
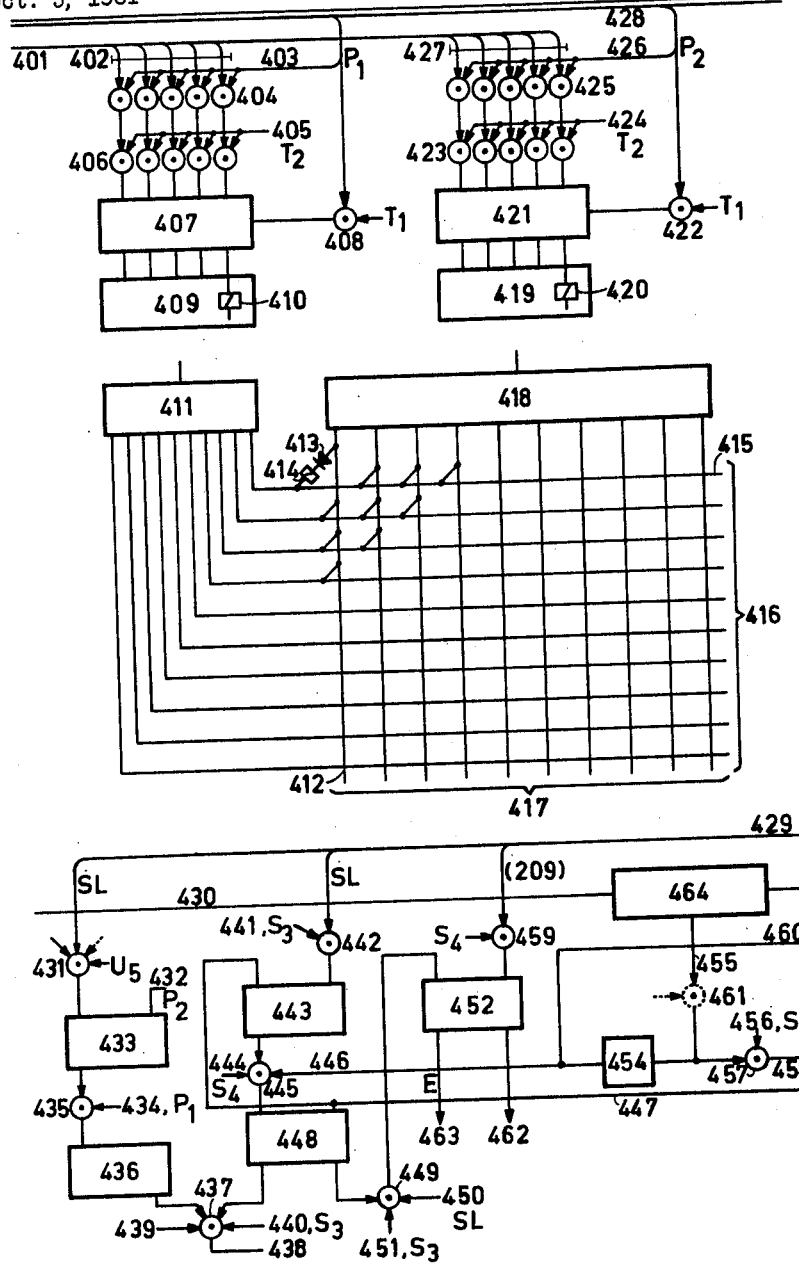
Figure 8:
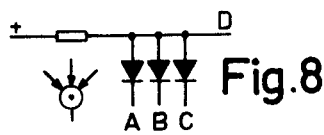
FIG. 8 shows an "and" circuit.

(1) The "and" circuit shown in FIGURE 8. This circuit possesses a number of input circuits such as A, B, and C, each comprising a diode and an output circuit D. A voltage, which is higher than the voltages which are supplied to the input circuit, is connected by way of a resistance to the output circuit D. As long as the potential of the input circuits is low the output circuit will also have a low potential. If one or two of the input circuits have a high potential the diode in the input circuit with the lowest potential still remains conductive, so that the output voltage remains low. Only if all the input circuits have a high potential will the output voltage at D be high too. Instead of this "and" circuit, normal gating circuits comprising grid controlled electronic tubes can be applied. Its symbol is a circle with a point in its centre with arrow heads for the input circuits and a radial line for the output circuit (see 459, FIGURE 4 and FIGURE 8).

(2) The "or" circuit has the same character as the "and" circuit, but the direction of the diodes is reversed while a voltage, which is lower than both "bit voltages" is applied to the resistance. As long at the input circuits have a low potential the output voltage will also be low. As soon, however, as one of the input circuits receives a high potential the diodes in the other input circuits are blocked, so that the output voltage becomes high.

"And" and "or" circuits are described on page 38 of the above mentioned book.

The "and" and "or" circuits described react to the occurrence of high voltage bits. If the circuits are to react to low voltage bits the "and" circuit described is suitable as an "or" circuit and the "or" circuit described can be used as an "and" circuit.

(3) Trigger circuits or flip-flop circuits. A bi-stable trigger circuit is a circuit including two voltage controlled electronic devices such as grid controlled electron tubes or transistors. The connections are such that if one of the devices conducts, it applies such a voltage to the control element of the other device that this other device is either blocked or carries a low current. Consequently this system has two stable states and cannot be in any other state. There are two input circuits or control circuits connected to the two control elements of the two electronic devices e.g. to the grids of the two tubes, by which input circuits the state of the trigger circuit can be changed. If e.g. a negative pulse is applied to the grid of a conductive tube of a trigger circuit, the circuit is switched over. There are, as a rule, two output circuits, each connected to the anode circuit of one of the tubes if electron tubes are used, or the collector circuit if transistors are used. One of these output circuits has a high potential if the one condition of the circuit prevails while the other has a high potential in the other condition of the trigger circuit. Similar circuits are built with transistors, and in this case the switching is generally effected by applying a positive pulse to an input circuit. The symbol of a trigger circuit used in the figures of this specification is a rectangle with two input circuits entering it at the top and two output circuits leaving it at the bottom. In the specification the following convention as to the conditions is employed. One of the conditions is called the set condition, and the other the reset condition. The set condition is caused by applying a positive pulse to the left-hand input circuit, the reset condition by applying a positive pulse to the right-hand input circuit. In the set condition the left-hand output circuit has a high potential and the right-hand output circuit a low potential, while in the reset condition this relation is reversed. This circuit is the so-called bi-stable trigger circuit with two stable conditions. In some cases a mono-stable trigger circuit is used which, after being set, returns within a given time interval to its reset condition. In the drawings the same symbol is used for this circuit as well as for the bi-stable circuit. Both circuits are well-known in the art and described in the above mentioned book under the name of flip-flop circuit and in many other publications.

(4) Magnetic matrix storage devices. The operation of these devices may be derived from the specification, while they are moreover described in chapter 8 of the above mentioned book.

(5) Magnetic drum storage devices which are also described in the above mentioned book e.g. on page 297 and in chapter 7. They are, moreover, well-known in the art.

(6) The code recognizer. Various circuits may be used for this purpose and are well-known in the art. A short description of an example will be given. This example comprises a matrix circuit constructed more or less as the matrix shown at the lower right-hand side of FIGURE 2. For every bit in the code signals out of which certain signals must be recognized, the matrix comprises two wires of a first type, one of which has a high potential if the bit is 1 and the other of which has a high potential if the bit is 0. These wires run through the matrix in one direction. For every signal to be recognized, the matrix comprises a wire of the second type in the direction transverse to the first one. This wire is connected by a diode to each wire which obtains a high potential if the signal to be recognized is applied. This requires as many diodes for each of the wires of the second type as there are bits in the signals. The diodes are arranged according to an "and" circuit and consequently the said matrix wire will only obtain a high potential if the signal to be recognized is applied.

(7) Code converters. Various constructions for these circuits are well-known in the art. They may consist of a combination of a code recognizer, comprising a wire for every possible signal which can be applied to the converter, and a transmitting matrix of the type described for transmitting back the number of the selected line selecting relay and shown in FIGURE 6. In this system each conductor for a certain signal in the recognizer matrix is connected to an input circuit of the transmitting matrix for this same signal. Other, and more simple converter circuits are, however, well-known in the art.

(8) Comparison circuits. These circuits are well-known in the art of designing computers, and need not be described in detail. In a possible embodiment the bits out of each pair of corresponding bits are applied to input circuits of an "and" circuit for this pair while the inverted bits are applied in a similar way to other "and" circuits. The output circuits thereof are combined by means of an "or" circuit and the output circuits of these "or" circuits are combined by "and" circuits in the case of equality of the code-signals.

The ring counter used in the system is of a well-known type and does not need description either. It may be obtained from various publications.

The system according to the invention comprises many diode switching circuits such as "and" circuits, "or" circuits, matrix circuits, converter circuits, etc. The number of such circuits which can be connected in series is restricted. As soon as the maximum number of such switching circuits is reached, an amplifier is inserted between the last switching circuit of a series and the first of the next series. Cathode follower circuits or similar transistor circuits are suitable for this purpose. These amplifier circuits are not shown in the diagrams of the embodiments described in the specification. They may form part of converter circuits, comparison circuits, etc. The insertion of such an amplifier stage does not, however, change the principle of the system.

In various cases change in the level of control potentials will be necessary between a controlling and a controlled circuit. The means for this purpose are, as a rule, not shown but well-known in the art.

In the case of certain circuits being repeated many times in the system, only one of these circuits is shown more or less completely with all its diodes and resistances. If all these elements were shown in every part of the circuit it would become so complicated as to be unreadable.

The first embodiment described comprises a display board on which display units, each of which may show various numerals, letters or other signs are set under the control of a magnetic ring core storage system. The units are driven step-by-step, each of them by its own stepping magnet. The display board is used to show a number of similar data, such as stock quotations. The display units are arranged in lines. Each line shows information relating to a certain subject, such as the quotations for certain shares on different exchanges. The units on a line are set simultaneously. The system can, however, also be used for the simultaneous setting of one single group of units.

Figure 1:
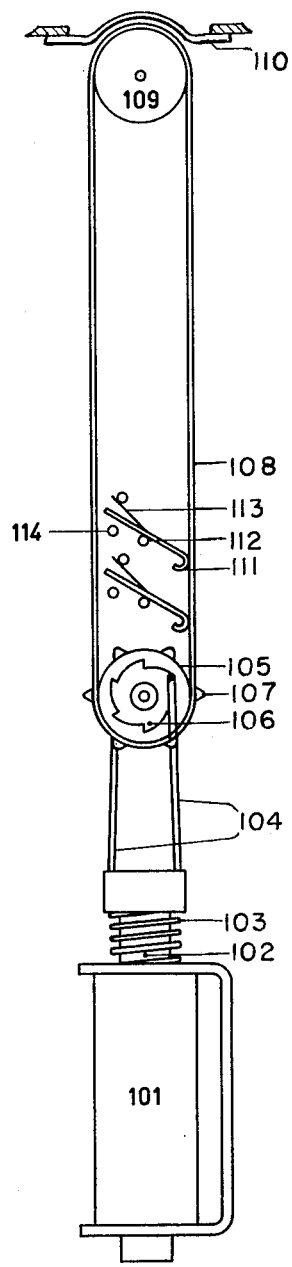

The display units applied in the system are no part of the invention, but the operation of the embodiments described can only be understood if the reader is acquainted with the operation of the type of display unit used. Therefore a short description of the operation of an example of such a unit will be given with reference to FIGURE 1. It will be obvious from the further description, however, that the application of the invention is by no means restricted to systems comprising units completely corresponding to the type of unit described by way of example. This unit comprises a stepping magnet 101 with a plunger core 102. The plunger core is driven upwards by a spring 103 and can be drawn downwards by the magnetic field generated by the coil of the stepping magnet.

When moving up- and downwards the core drives, by means of resilient wire pawls 104, which are carried by a small support fixed to the plunger core, a drum 105, which is rotatable around an axis. Each of the pawls 104 possesses a part bent perpendicular to the plane of the drawing, which cooperates with a ratchet wheel with internal teeth, such as 106, countersunk in the drum 105. The two pawls drive the drum in turn when the core moves up- and downwards. On its outer surface the drum 105 possesses sprockets 107, by means of which it drives an endless belt 108, provided with openings adapted to the sprockets. This endless belt passes at the other end of the unit over a freely rotatable pulley 109, which is situated immediately behind a small window 110 of the display board. The endless belt carries a number of signs on its outer surface. In each position of rest of the belt reached when the plunger core has returned to its position of rest, such a sign is shown behind the window 110. A code transmitter, cooperating with the belt, signals back the position reached by the belt, and consequently the sign shown behind the window. This code transmitter operates by means of feelers 111, which rest on the belt near its edges. Each of these feelers is rotatable around an axis 112, and carries a spring 113, resting against a pin, and tending to rotate the feeler to the left with its left-hand end against a contact pin 114. As long, however, as the feeler 111 rests on the belt 108 the left-hand end cannot reach this pin 114 because the belt prevents rotation. In the two tracks of the belt on which the feelers rest, recesses are present. If such a recess is under a feeler this feeler passes through this recess and a recess in the supporting strip so that the left-hand end of the feeler is able to reach the contact pin and closes a circuit connected to this pin. The unit used in the example described possesses six feelers near one edge of the belt. The track of the belt on which these feelers rest is provided with recesses, which are arranged according to a chain- or shifting code. In each position of rest of the belt, these recesses cause the six feelers to close circuits in a certain combination, forming a code indication of the position of the belt and of the sign shown behind the window. The six feelers provide a binary code with 6 bits, permitting the belt to be adjusted in sixty-four and no more than sixty-four positions. Near the other edge of the belt one single feeler rests on the belt in a track in which such recesses are present that either in all possible positions of rest of the belt the number of circuits closed by all feelers is even, or in all possible positions the number of circuits closed by the feelers is odd. This seventh feeler permits the checking of the operation of the code transmitter and a warning to be given if incorrect signals are transmitted e.g. because of deficiences in the feeler contacts or in the circuit connected to them. For this purpose a well-known type of circuit is connected to the feelers which is able to establish whether the number of circuits closed by the contacts is either even or odd, and gives an alarm signal if the condition in this respect is not satisfied.

Figure 9:
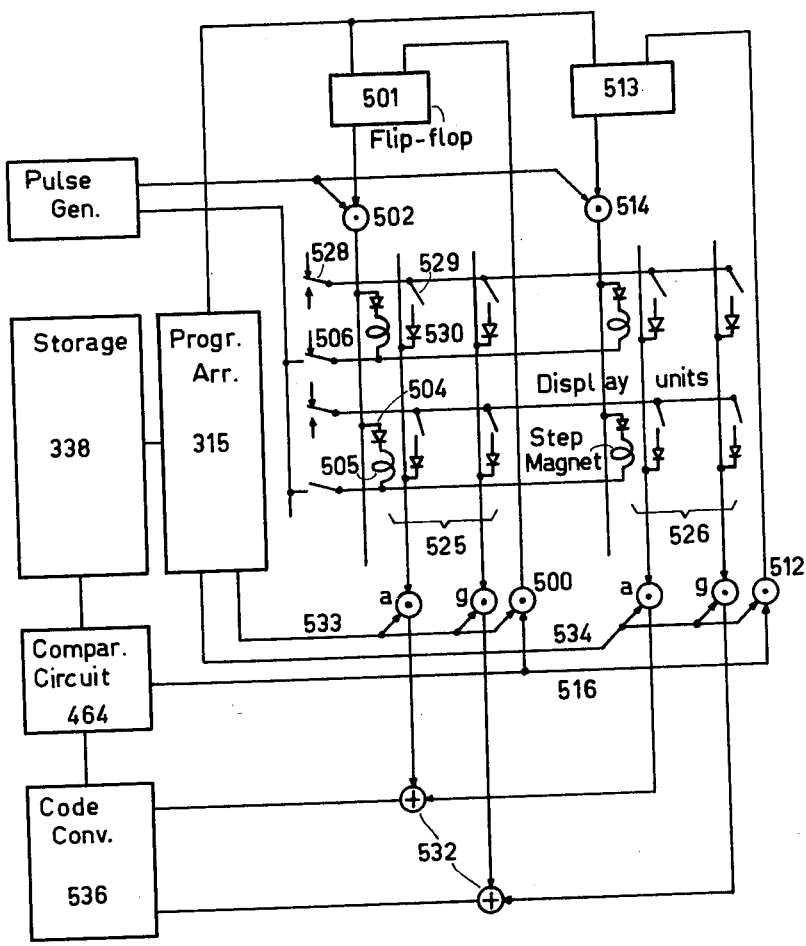
FIG. 9 shows a general outline of the system.

The complete circuit diagram of the system now to be described is obtained by placing FIGURES 2 to 5 side by side from left to right in that order, while an over-all impression of the system may be obtained from FIGURE 9. Since FIGURE 9 employs the same components as do FIGURES 2 to 5, the same reference characters are employed for like components.

Firstly, the general concept of the system used in a display board will be described. In such a display board, there are simultaneously set the display elements belonging to a coherent group of such elements, in accordance with the registrations of the eventual settings in a storage in which these registrations are not simultaneously available for use, but can be obtained only successively. The display units are driven by step magnets fed by the same pulse source, so that these units move forward simultaneously. Each unit closes and opens a number of signaling-back contacts in a combination depending on the position reached, and in this way signals back its position by means of signaling-back circuits connected to these contacts. Between successive steps an investigation is made as to whether one or more of the units have reached their eventual settings. For this purpose, a programing arrangement successively controls the reading out of all locations in the storage that register signals determining eventual settings of units and the supply of these signals to a first set of input circuits of a comparison circuit. At the same moment at which this comparison circuit receives the signal designating the setting of a certain unit, the programing arrangement controls electronic switches to connect the signaling-back circuits of that unit to a second set of input circuits of the comparison circuit. It also controls an electronic switch to connect the output circuit of the comparison circuit to a control arrangement for an electronic switch in the pulse supply circuit of the associated unit. This switch was closed by the programing arrangement at the beginning of the setting. If no equivalence of the signals supplied to the comparison circuit is established, nothing happens, and the unit can receive the next stepping pulse. If equivalence is established and the unit has apparently reached its eventual position, the voltage then supplied to the output circuit of the comparison circuit will cause the control arrangement to control the opening of the switch in the pulse supply circuit for the unit, so that the unit will no longer receive pulses and will remain in the position reached.

The system has two important advantages. The setting can be controlled by a storage, such as a matrix storage, in which the stored data are not simultaneously available for use. These storage systems are less expensive and voluminous than storage systems, such as flip-flop storage systems, in which all data are available for use at the same time. Moreover, the comparison of the stored setting and the reached setting can be effected for all units by the same comparison circuit.

The units on the display board are arranged in rows and columns. One end of a winding of the stepping magnet 505 (FIGURE 5) of each unit situated in a certain column of display units is connected to a wire 511, 515, etc. allotted to this column. The other end of the winding of each display unit is connected to a wire which is allotted to the row on the display board in which the unit is situated (wires 507, 508 etc.). In this way the stepping magnet windings 505 are arranged in a matrix. A stepping magnet on the display board is excited by applying a voltage between the wire of the column and the wire allotted to the row on which the display unit is situated. In order to prevent the occurrence of currents in circuits in the matrix which are situated in parallel to the winding to be excited and which pass through windings which should not be excited, a diode, such as 504, is inserted in series with each winding. All these diodes have the same direction, which in the unit to be excited and selected by connecting certain wires to the current source corresponds to the direction of voltage and current, but prevents current from flowing in circuits parallel to this magnet.

If the units on a certain row are to be set, then the relay allotted to this row (e.g. 414, FIGURE 4) is excited. This relay switches over its contact 506 so that the wire allotted to this row (508) is connected to a source of pulses with a frequency of 50 cycles per second. The circuit for a certain stepping magnet of a display unit, e.g. the element situated in the first column and on the second row, is as follows: The positive terminal of the source of stepping pulses, the transistor switch 541, the wire 503, the transistor switch 502, the wire 511 allotted to the first column, the stepping magnet of the element in the first column and the second row, the wire 508 allotted to the second line, the relay contact 506, by means of which the second row is selected, and back to the negative terminal of the source of pulses. The circuits for the magnets of other display units have a similar character. The relay contact 506 selects the line, but does not close the circuits. This is effected by the transistor switches such as 502, 514, in the wires allotted to the columns. Such a transistor switch is controlled by a bistable trigger circuit such as 501 or 513. The control of the current in the stepping circuits by means of relay contacts would operate too slowly.

Figure 3:
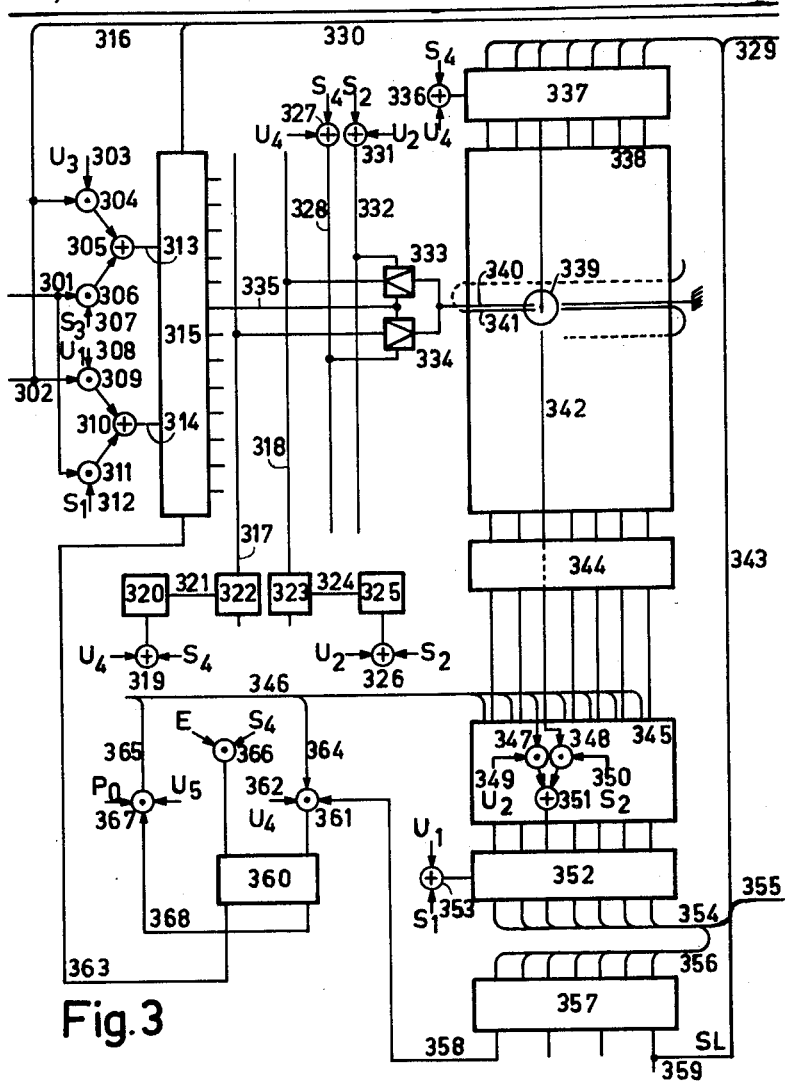

As has already been described above, each display unit possesses seven code contacts for signalling back its position. One side of each code contact in an element situated on a certain row of the board is connected to a wire allotted to this row (521, 522, 523, 524). When this row, e.g. the second row, is selected by closing the contact 506, for the purpose of setting the units on this row, the front contact 528 of the same relay connects the conductor 522, which is connected to the code contacts of all the display units of this row, to a source of voltage of $+1$ volts. In the position of rest this contact connects $-10$ volts to the same wire. Because of this change of voltage the contacts of the units on the said row are able to signal back their attained positions. A group of seven multiple wires such as the group 525 connects the other sides of the corresponding code contacts of the units situated in the same column. The wire A, e.g., connects all first code contacts; the wire B all second code contacts etc. In a similar way the multiples 526 and 527 connect the corresponding code contacts in the second and in the last column of display units. Each of the multiple wires connected to the code contacts of a certain column is connected to an input circuit of an "and" circuit (a–g) of well-known construction with two input circuits. The second input circuit of each "and" circuit in the same column is connected to a programing wire (533, 534, 535) for that column. The potentials which the code contacts of the unit on the selected row apply to the multiple wire of its column will only be able to pass the "and" circuit of this column if a potential differing from the quiescent potential is applied to the said programing wire by the programing circuit of the system. In the example described this programing circuit is a ring counter 315 (FIG. 3). The output circuit of each "and" circuit a, situated in the first multiple wire of each column, is connected to an input circuit of the "or" circuit $\bar{a}$ in the group of "or" circuits 532. Consequently, the potential determined by the position of the first code contact of the unit situated on the row selected by the closed contact 528 and in the column in which the "and" circuits are made conductive by a suitable potential of the programing wire for this column appears at the output circuit of this "or" circuit. This potential corresponds to the first bit of the code signal, which indicates the position of the selected display unit. The six other "or" circuits $\bar{b}-\bar{g}$ supply the six other bits of the signal received from the code contacts of the selected display unit.

The code in which the code transmitter of a display unit signals back the position of the unit by means of six feelers resting on a track near one edge of the belt is of necessity a so-called shifting or chain code. In such a code two successive signals differ therein, that the bit at one end of the signal has disappeared, all other bits have been shifted one position in the direction of this lost bit, while at the other end of the signal a bit has been added. The setting of the units is controlled by means of a binary code. This code is not subjected to the restrictions imposed upon a shifting code. It may be a well-known standard code such as a teleprinter code. If a display unit possesses six code contacts sixty-four different signals may be arranged from the six bits supplied by these contacts. If this unit must be able to be set in sixty-four different positions, in each of these positions one of the sixty-four different code signals is transmitted, and the signs on the belt may be arranged in such a way that if a certain a sign is shown behind the window the code transmitter transmits that code signal which corresponds to the said sign in the six-bit code in which information is supplied to the display board. If the information is supplied in teleprinter code, five of the bits produced by the code transmitter must correspond to the five significant bits of the teleprinter code, while the sixth bit must correspond to the shift-key signal, which shows whether either a letter, or a numeral or sign is transmitted. If, however, the number of signs to be shown is substantially less than sixty-four, or at any rate less than the number of signals which may be arranged with the bits produced by the code transmitter, it is undesirable to build the unit with a position of rest for each of these signals, because this would increase the setting time, if, however, the number of positions of rest is smaller than the number of signals which can be arranged with the number of code contacts, the restrictions imposed upon the shifting code will have the following result: the signals produced by the code transmitter cannot, as a rule, be adapted to any existing code, such as a teleprinter code, supplied to the display board. In this case a code converter must be applied. In the example described, such a code converter (536) is connected immediately behind the "or" circuits 532. This code converter converts the code produced by the display units into the code in which the signals are stored in the storage arrangement of the system, which controls the setting of the display units.

The code transmitter contacts of all the display units of the display board are arranged in a large matrix circuit. In this circuit contacts of units other than the one selected and situated in other columns are apt to apply potentials to the multiple code wires of the column of the selected unit. In order to prevent this application of the wrong potential, a diode, such as 530, is connected in series with each of the code contacts, such as 529. The direction of these diodes is the same for all contacts and corresponds to the voltage direction in the code circuits. In this way all by-pass circuits are blocked.

The setting of the display units in the example first described is controlled by a magnetic core matrix storage arrangement 338 (FIGURE 3) in which the signals which indicate the desired settings of the different units of a row of the board are temporarily stored. The core matrix possesses a large number of ring-shaped cores of magnetic material, such as 339. These cores are arranged in rows and columns. Each row, (horizontal in the drawing) is used to store the setting of one single unit. For each row of the matrix a wire such as 340 is arranged so as to pass through all cores of that row. This wire is called the row selecting wire and is used to select the said row. For this purpose a current is caused to flow through this row. The strength of this current is such that the strength of the magnetic field generated by this current in a core enclosing the wire is equal to ⅔ of the field strength necessary for causing the core to be magnetized to the extent required for storing a bit. This current has one direction for writing and the opposite direction for reading the row. The matrix possesses seven columns. A reading and writing wire such as 342 passes through all the cores situated in the same column. This wire is used for writing (storing data in the matrix) as well as for reading (receiving stored information from the matrix). For writing only, a substantial current is caused to flow in this wire and this current has such a strength that the field generated in each core enclosing this wire has a strength which is substantially equal to the strength of the field generated by the current in the selecting wire. Furthermore a bias wire 341 is carried through all the cores of the matrix. In this wire an unvarying current flows which generates a field in all the cores the strength of which field is half that of the field generated by the current in one of the other wires. Because of the shape of the hysteresis loop of the magnetic material of the cores (which, as a rule, is a ferrite) this current effects no perceptible change in the state of magnetization of a core.

Be it assumed that a row of the core matrix must be read. A current is then caused to flow through the selecting wire 340 of this row with such a direction that the field caused by the bias wire and the field caused by the selecting wire have the same direction. The total field in the cores of the selected row will then be sufficient to cause each core which at that moment is magnetized in the opposite direction to reverse its magnetization suddenly. This causes a voltage pulse to be induced in the reading and writing wire 342 passing through such a core. After the reading of the line all cores are magnetized in the same direction, the direction of the quiescent magnetization. A core magnetized in this way is said to store a "0 bit" and does not cause a voltage to be induced in the reading wire while reading is effected. If on the other hand a signal must be written on the said row, first a reading operation is performed causing all cores to obtain the quiescent magnetization, after which a current with such a direction is caused to flow in the selecting wire that the field generated by it opposes the field generated by the bias wire. The field caused by the selecting wire will, moreover, dominate, but will be insufficient to cause a perceptible change in the magnetization. If nothing more happens the cores on the line maintain their quiescent magnetization and store a "0 bit." In order to write a 1 bit in a certain core a current is caused to flow in the reading and writing wire passing through said core, which has such a direction that the field generated by it in the core has the same direction as the field already generated in the core by the resulting field from the bias and selecting wire and possesses the strength mentioned above. A core, situated on the intersection of the reading and writing wire and the selecting wire, will then be magnetized in a direction which is opposite to the direction of the quiescent magnetization. Such a core will induce a pulse in the reading wire passing through it when the row in the matrix on which it is situated is read. During the writing operation the current in the selecting wire 340 is supplied by way of a transistor switch 322, which is able to effect switching operations while carrying this current, and which is common to all selecting wires. Current flows through a common supply wire 317, and a transistor switch 334, which is individually allotted to the selecting wire but which is not able to close or break the current without being damaged. During the reading operating the current flows from the selecting wire through a transistor switch 333 individually allotted to the selecting wire, but unable to close or break the current, a common wire 318 and a common transistor switch 323 which is able to effect switching operations under current. A row in the core matrix is selected by means of a counter e.g. a ring counter circuit 315 of well-known construction, which needs no further elucidation. It successively applies a switching voltage to each of the different wires 335 allotted to the rows of the storage matrix. These switching voltages are applied to both transistor switches 333 and 334 allotted to the row selected by the ring counter, but are insufficient to make these switches conductive. For the purpose of making such a switch conductive a control voltage must also be applied to its second controlling circuit, e.g. because such a transistor switch is controlled by way of an "and" circuit. During the writing operation such a voltage is applied by way of the common wire 328, on which a pulse appears at the writing moment, to all writing transistor switches, such as 334. Only the transistor switch selected by the ring counter can be made conductive, however, by this pulse. For the purpose of reading, a switching voltage is applied by way of the common wire 332 to all transistor switches such as 333 used for reading. This pulse will only be able to make that transistor switch 333 conductive which is selected by the ring counter 315. Shortly after the appearance of the switching pulse on the wire 328, a switching pulse is applied to the control input circuit 321 of the transistor switch 322, causing this switch to close a current in the writing direction in the selecting wire 340 indicated by the ring counter. Just before the end of the switching pulse applied to the wire 328 the switching pulse voltage is removed from the control input circuit 321. Consequently the current in the selecting wire is not closed and broken by the transistor switch 334 but by the common transistor switch 322. In a similar way, while reading, the current is closed and broken by the transistor switch 323 as a result of a switching pulse applied to the control input 324, which switching pulse occurs in the interval occupied by the switching pulse applied to the wire 332.

The display board in the first embodiment described uses three sources of synchronizing pulses. While receiving information from extraneous sources the circuit must be controlled by synchronizing pulses supplied by the source of information, causing the synchronization to correspond to the signals supplied to the board. For internal switching operations an internal source of synchronizing pulses, supplying pulses of a very high frequency, is applied. A source of slow synchronizing pulses is, moreover, used to control the excitation of the row selecting relays of the display board. Each of these sources of synchronizing pulses applies pulses in a cyclic order to a number of synchronizing wires. When switching over from one source of synchronizing pulses to another source care must be taken that the source which is switched off completes its last cycle, and that the source which is switched on always starts at the beginning of a cycle. Moreover, overlapping operation of two sources of synchronizing pulses must be avoided. Circuit arrangements for this purpose will be elucidated while describing the complete system.

After describing the operation of certain parts of the display board and its control circuit, the setting of a piece of information on a certain row of the display board of the first embodiment will now be described in detail. This description will refer to the FIGURES 2, 3, 4 and 5 which should be arranged from left to right in this order in order to obtain a circuit of the complete system. In order to facilitate the reading of the drawings the first figure of any numeral used as an index is equal to the number of the figure, so that no figure numbers need to be quoted in the description.

It is assumed that the display board and its control circuit are at rest. The display board receives information according to which it is be set by way of a communication channel, consisting of a number of wires 346 and which is carried along various display boards and other apparatus to which information must be supplied. The board or apparatus which is to react to a certain piece of information is selected by transmitting a call signal. The signals used for call signals are, however, also used as signals while transmitting information, so that special measures are required to indicate when such a signal is used as a call signal. In the example described a pulse voltage is applied for this purpose to a special wire 364 in the communication channel. The communication channel 346 comprises seven wires for simultaneously transmitting the bits of a signal. It comprises, moreover, a number of wires through which synchronizing pulses are supplied. It is assumed that extraneous synchronizing pulses are supplied to the various parts of the circuit by means of six wires to which pulses are applied in a cyclic order. These pulses pass through the device 223 to the six output circuits combined into the group 224. It is possible for the communication channel to contain six wires 222 for the transmission of the extraneous synchronizing pulses. The device 223 then only comprises connections for these wires and, if necessary, amplifiers. If the communication channel has a considerable length it will be important to reduce the number of wires, and it is possible to transmit the synchronization information by means of three wires. Some of the six pulses will then be indicated by the combined presence of pulses on more than one of these three wires. The device 223 in this case comprises a decoding circuit of well-known type and of the same character as the decoding circuit which will be described in connection with the source of rapid synchronizing pulses.

If the extraneous synchronization is operative, the trigger circuit 207 is reset, and the trigger circuits 214 and 219 are set. Consequently the potentials of the wires 215 and 221 are high so that the four "and" circuits 225 and the two "and" circuits 226 will be able to pass the extraneous synchronizing pulses to the output circuits U1, 2, 3, 4, 5 and 6. Because the trigger circuit 207 is reset, the potential of the wires 209, 302 is high, so that the "and" circuits 309 and 304 are conductive and the ring counter 315 receives the first and the third extraneous synchronizing pulse $U_1$ and $U_3$ by way of the conductors 314, 313, the "or" circuits 310 and 305, the "and" circuits 309 and 304 and the input circuits 308 and 303. These pulses cooperate in a well-known way to control the ring counter circuits, the first synchronizing pulse causing the counter to step. For the time being this counter remains in its position of rest, because the trigger circuits of the ring counter are compelled to remain in their reset condition by a potential applied to the wire 363. This potential is supplied by the trigger circuit 360 in the set condition. As will be described later on, this trigger circuit is set at the end of a setting cycle of the display board. The seven wires in the channel 346 which carry the bits of the signals are connected to the gating system 345. This gating system is shown in detail for the third wire. By means of an "and" circuit 347 and an "or" circuit 351 this gating system can connect the said third wire to the third trigger circuit in a flip-flop register 352. A pulse on the said third wire sets the trigger circuit. During the reception of the signal the "and" circuit 347 is made conductive for a short interval by the second extraneous synchronizing pulse $U_2$, which is applied to the input circuit 349 of the "and" circuit 347. Before the bits of the signal are able to reach the trigger circuits in the register these trigger circuits have all been reset by the first extraneous synchronizing pulse $U_1$, which reaches them through the "or" circuit 353. For this purpose the input circuit which can reset each trigger circuit in the register is connected to the output circuit of this "or" circuit. The reception of the bits of the signals consequently sets the trigger circuits in the flip-flop register in accordance with the signal received. In this phase of the operation only the code recognizer circuit 357 reacts to the setting of the flip-flop register. If the signal by means of which the display board is selected is received, the code recognizer circuit applies a high voltage to the output circuit 358. As a rule this has no effect, for the signal may be part of information supplied to any other apparatus connected to the common channel. During the transmission of a call, however, a special wire in the channel, used to announce the selection operation, applies a high potential to the input circuit 364 of the "and" circuit 361. The fourth extraneous synchronizing pulse $U_4$ which is applied to the input circuit 362 of the "and" circuit 361 will then pass this "and" circuit and resets the trigger circuit 360, which makes the potential of the conductor 363 low and thus permits the ring counter to leave its position of rest. The display board is now ready for the reception of information. Before the end of the synchronizing cycle in which the selection is performed this readiness for reception is signalled to the distant sender by sending the fifth extraneous synchronizing pulse back to it by way of a special wire in the common channel 346 and connected to the "and" circuit 367. The said fifth pulse is applied to an input circuit of said "and" circuit, but is only able to pass this "and" circuit if two conditions are met: (1) the control circuit is at rest, for only in this case does the second input circuit connected to the programming wire $P_0$ have a high potential, (2) the board is called, for only then is the trigger circuit 360 in the reset condition, causing the third input circuit of the said "and" circuit to have a high potential. For the distant sender the reception of the said fifth pulse is the signal that the selected display board is ready for reception, to which signal it reacts by starting the transmission of information. If desired the special wire 365 may be connected to the same wire 364 in the common channel 346, through which, during the appearance of the fourth synchronizing pulse, the making of a call was announced. If the selected display board was occupied, e.g. because it was setting its units in accordance with information previously received, then the flip-flop register 352 would not have been able to receive the call signal because the extraneous synchronization would have been inoperative. No pulse would in this case have been retransmitted to the distant sender. The sender then knows that no connection with the display board has been obtained, does not transmit information, and repeats the call. During the following cycle of the synchronization the next signal is received. At the occurrence of the first synchronizing pulse in this cycle the ring counter, which is no longer compelled to remain at rest, switches over to its first position in which it permits the transistor switches 333 and 334 of the first row in the storage matrix 338 to become conductive. Furthermore, the flip-flop register 352 is reset by the pulse $U_1$. In the second interval of the extraneous synchronization, i.e. at the occurrence of the pulse $U_2$, the trigger circuits in the register 352 are set in accordance with the bits of the received signal which flow through "and" circuits such as 347. The code recognizer 357 is no longer able to initiate any switching operation when receiving the own call signal because the special wire 364 remains at a low potential. In the second interval, moreover, the first row of the matrix is read. The 2nd pulse $U_2$ reaches the conductor 332 by way of the "or" circuit 331 and causes the reading switch 333 of the said first row, selected by the ring counter, to become conductive. Furthermore, the pulse $U_2$ is applied to the pulse shaper 325 by way of the "or" circuit 326. The pulse shaper then produces a pulse which occurs within the interval occupied by the 2nd synchronizing pulse. This short pulse causes the transistor switch 323 to become temporarily conductive, thus causing a pulse to flow in the selecting wire for the first row. In the example described the pulse shaper 325 consists of a blocking oscillator which is triggered by the second synchronizing pulse to generate a pulse of the required duration. The operation described above causes the first row in the matrix to be read in the way already described, and all the cores of this row to be reset. Because the rapid synchronization is not operative, the pulses generated while reading the matrix cannot pass the "and" circuits such as 348 in the gating system 345 and will not influence the flip-flop register 352. In the fourth interval the fourth extraneous synchronizing pulse $U_4$ reaches the conductor 328 through the "or" circuit 327, so that the writing switch 334, allotted to the selected line, becomes conductive. Moreover, a pulse passing through the "or" circuit 319 reaches the pulse shaper 320, which is a blocking oscillator also, and provides a pulse which is just a little shorter than the original pulse and occurs within the interval occupied by this pulse. This pulse, supplied by the blocking oscillator, causes the transistor switch 322 to become conductive for a short interval, so that a short pulse in the writing direction is caused to flow in the selecting wire 340 of the first row of the matrix. Moreover, by way of the "or" circuit 336 the fourth extraneous synchronizing pulse reaches all writing amplifiers comprised in the system 337, causing these amplifiers to become operative, so that pulses corresponding to the setting of the flip-flop register 352 will flow in the writing and reading wires such as 342 of the core matrix. The setting of the flip-flop register is in this way transferred to the first row of the core matrix by way of the cables 354, 343 and the amplifier 337. This operation is repeated for all signals received. Each signal is written on the following row of the matrix. The last signal is a special signal, reserved for indicating the end of the piece of information transmitted, and will be called clearing signal. This signal is recognized by the code recognizer 357 which continuously watches by way of the cable 356, 354 the setting of the flip-flop register 352. If the code recognizer receives the clearing signal it applies a high potential to its output 359. This causes the input circuit 201 of the "and" circuit 203 to obtain a high potential so that the extraneous synchronizing pulse $U_5$, applied to the second input circuit 202 of the "and" circuit can pass the latter circuit and set the trigger circuit 207. This causes the conductor 209 to obtain a low potential, which interrupts the supply of extraneous synchronizing pulses to the ring counter 315 through the "and" circuits 304 and 309. Because the trigger circuit 207 is set and the trigger circuit 286 is reset and, consequently, the conductor 210 has a high potential the said fifth extraneous synchronizing pulse is able to pass the "and" circuit 212 and to reset the trigger circuit 214. The trigger circuit then applies a low potential to the conductor 215, causing the "and" circuits 225 in the first four output circuits U1, 2, 3 and 4 of the extraneous synchronization circuit to become non-conductive. The extraneous synchronization nevertheless finishes its cycle bceause the last two "and" circuits 226 are still conductive. As soon as the sixth pulse is supplied, however, no further pulses are supplied. The second pulse in the next cycle, which does not reach the output wires 227 any more, still flows by way of the conductor 216 to the "and" circuits 217 and 218. Because the reset trigger circuit 214 applies a high potential to the upper input circuit of the "and" circuit 218, the said pulse passes this "and" circuit and resets the trigger circuit 219. This trigger circuit then causes the potential of the conductor 221 to become low so that the "and" circuits 226 also become non-conductive and the supply of extraneous synchronizing pulses is completely interrupted.

As will be described later on the trigger circuit 273 is set at this moment. Since, the trigger circuit 239 is reset and the conductor 241 consequently has a high potential, the application of a high potential to the conductor 208, caused by the setting of the trigger circuit 207 results in the application of a high potential to the upper input circuit of the "and" circuit 277. The trigger circuits 219 and 250 are in the reset condition so that the two input circuits of the "and" circuit 280 have a high potential. Consequently, the conductor 279 and the left-hand input circuit of the "and" circuit 277 have a high potential. The conductors 269 apply the rapid internal synchronizing pulses to the "and" circuits 297 and 298. When the fourth of these pulses, $S_4$, is applied to the input circuit of the non-conductive "and" circuit 298 it also reaches, by way of conductor 276, the right-hand input circuit of the "and" circuit 277 and, because of the high potentials of the other input circuits, is able to pass it, and to set the trigger circuit 281. This causes the conductor 282 to obtain a high potential so that the three "and" circuits 297 in the rapid synchronization conductors S1, 2 and 3 become conductive, and the first three pulses of the rapid internal synchronization are able to pass. As soon as the second pulse appears, the conductor 283 applies it to the left-hand input circuit of the "and" circuit 284. It passes this circuit because of the high potential applied to the upper input circuit by trigger circuit 281 in its set condition and sets the trigger circuit 286. This trigger circuit then applies a high potential to the conductor 287, causing the "and" circuit 298 to become conductive. From that moment on the source of rapid synchronizing pulses supplies all four rapid synchronizing pulses to the system. Because the trigger circuit 207 is set, and consequently the conductor 208, 301 has a high potential, the ring counter 315 receives by way of the "and" circuits 311 and 306, the "or" circuits 310 and 305 and the conductors 314 and 313 the first and the third rapid internal synchronizing pulses, which are applied to the input circuits 312, 307 of the "and" circuits. These pulses causes the counter to step. It passes over all lines of the matrix on which no signals have been written. This has no further effect. The presence of such lines may be important. The lengths of all lines on the display board are not necessarily the same and the storage matrix must be large enough to control the setting of the longest line. For controlling the setting of a shorter line on the board not all rows in the storage matrix will contain information, and signals still present as a result of previous control cycles on rows in the matrix on which no information has been written during the last reception period will be ignored, because no corresponding display units are present on the selected shorter row of the board. In each of its positions the ring counter not only applies a voltage to a selecting conductor 335 of the core matrix, but also to a programming wire in the programming wire group 330. Such a programming wire will be indicated by the number of the position of the counter in which a special potential is applied to it (e.g. $P_4$, $P_5$ ... ). The current in the selecting wires of the matrix is controlled by the 2nd and 4th internal synchronizing pulse in a way similar to that in which it is controlled by the extraneous synchronization during the reception of information from the common channel. In this case, however, the reading of a line does influence the setting of the flip-flop register 352 because now the second rapid synchronizing pulse $S_2$ is applied to the input circuits 350 of "and" circuits, such as 348 in the gate circuit system 345, making these circuits conductive, so that the pulses induced in the conductors 342 while reading and amplified by the reading amplifier 344, are able to set the trigger circuits in the flip-flop register in accordance with the bits written in the row which is read. Just before the reading operation is performed the synchronizing pulse $S_1$ is applied by way of the "or" circuit 353 to the register causing all trigger circuits in the flip-flop register to be reset.

After the reading of a row the information is removed from the row of the core matrix, but at the occurrence of the fourth rapid synchronizing pulse $S_4$ which is applied to the writing amplifier in system 337 by way of the "or" circuit 336, this information is received from a flip-flop register again and is rewritten on the said line. After passing over the rows in which no information has been written the counter continues its stepping operation. It then successively selects the rows in the matrix on which information has been written. The programming wire $P_1$ for the first line is connected to the input circuit 231 of the "or" circuit 230, so that the right-hand input circuit of the "and" circuit 236 obtains a high potential when the first line is selected. Because the trigger circuit 207 is set, which means that the extraneous synchronization system is inoperative, the wire 238 and the input circuit of the "and" circuit 236 connected to it have a high potential. Moreover, the trigger circuit 235 is still in the reset condition so that the upper left-hand input circuit of the "and" circuit 236 also has high potential. As soon as the rapid synchronizing pulse $S_3$ appears at the upper input circuit of this "and" circuit the trigger circuit 239 will consequently be set. This has various consequences. The conductor 240 obtains a high potential, so that, by way of the "or" circuit 275, the upper input circuit of the "and" circuit 278 receives a high potential. As, moreover, the trigger circuits 219 and 250 are in the reset condition, the left-hand input circuit of this "and" circuit also obtains a high potential by way of the "and" circuit 280. The fourth internal synchronizing pulse $S_4$ applied to the wire 276 will, therefore, be able to pass the "and" circuit 278 and to reset the trigger circuit 281. This causes the wire 282 to obtain a low potential and the "and" circuits 297 to become non-conductive, so that the first three pulses of the rapid synchronization will be unable to pass. The second synchronizing pulse, which is unable to pass the second "and" circuit 297 is nevertheless still supplied by way of conductor 283 to the left-hand input circuit of the "and" circuit 285 and as the upper input circuit of this "and" has obtained a high potential as a result of the resetting of the trigger circuit 281, the said pulse can reach the trigger circuit 286 and reset it. This causes the conductor 287 to obtain a low potential, so that the "and" circuit 298 in the fourth output circuit of the rapid internal synchronization circuit becomes blocked. The internal synchronization has then become inoperative.

The resetting of the trigger circuit 286 applies a high potential to the conductor 210. The setting of the trigger circuit 239, moreover, applies a high potential to the upper input circuit of the "and" circuit 242. The fourth pulse of the slow synchronization, although unable to pass the "and" circuit 256 will under these circumstances reach the left-hand input circuit of the trigger 245 by way of conductor 244 and the "and" circuit 242 and set it. This supplies the conductor 246 with a high potential so that the first three "and" circuits 255 in the output circuits of the slow synchronization circuits become conductive and the first three slow synchronizing pulses are able to pass. The trigger circuit 245 in its set condition applies a high potential to the upper input circuit of the "and" circuit 248. The second slow synchronizing pulse, supplied by way of conductor 247, will then be able to pass this "and" circuit and to set the trigger circuit 250. In its set condition the trigger circuit applies a high potential to its output circuit 252, thus making the "and" circuit 256 in the fourth output circuit of the slow synchronization circuit conductive. The slow internal synchronization is then operative. Its object is to control the setting of the selecting relays. These relays must be set in accordance with the information written on the first and second rows for the storage matrix. The relays are electromechanical relays and consequently operate relatively slowly, so that their operation cannot be controlled by rapid synchronizing pulses suitable for the control of trigger circuits. The signal which was transferred from the first line in the storage matrix to the flip-flop register 352 during the previous cycle of the rapid synchronization is still present in this register when the slow synchronization starts its operation because since the registration no pulse $S_1$ or $U_1$ has occurred. The output circuits of the five trigger circuit set in accordance with the significant bits of the signal are connected by way of the cable 354, 343, 329, 401 to the five conductors 402. These conductors pass the "and" circuits 404. One input circuit of each of these "and" circuits is connected by way of conductor 403 to the programming wire $P_1$ to which a high potential is applied when the ring counter 315 is in its first position, in which it selects the first row of the core matrix, so that these "and" circuits are able to pass the bits received from the register 352 when the first row of the matrix has just been read. A second set of "and" circuits 406 is inserted in the conductors 402. One input circuit of these "and" circuits is connected to the conductor 405 to which the second internal slow synchronizing pulse $T_2$ is applied, so that the information, received from the first row in the matrix and now stored in the register 352 is transmitted to the relay amplifier 407 at the occurrence of the said pulse $T_2$. Each of these relay amplifiers is terminated by a bistable trigger circuit. In each of these trigger circuits a connection in which a sufficient current flows only in the set condition of the trigger circuit, passes through the winding of a selecting relay, such as 410, in the relay group 409. Such a relay will, therefore, be excited when its trigger circuit is set. The trigger circuits are previously reset by the first slow internal synchronizing pulse, $T_1$ of a cycle. This pulse is supplied to the group 407, through the "and" circuit 408 so that it can reach the group only if the first row in the matrix is selected and consequently the first programming wire $P_1$, which is connected to one of the input circuits of this "and" circuit possesses a high potential. This resetting operation is, therefore, not repeated any more during the rest of the operation, because either the pulse $T_1$ or the potential on the wire $P_1$ will be absent, or both. At the end of the slow synchronization cycle the trigger circuits in the system 407 are in the set or reset condition, and the relays 410 in the group 409 are excited or non-excited in a combination which corresponds to the signal written on the first row of the core matrix.

The third slow synchronizing pulse $T_3$ is applied to the righthand input circuit of the trigger circuit 239 and causes this trigger circuit to be reset. In the way already described before for another synchronization system this puts an end to the operation of the slow synchronization as soon as it has finished its cycle. No new cycle of the slow synchronization will be started because of the reset condition of trigger circuit 239. The trigger circuits 207 and 273 are set, so that two of the input circuits of the "and" circuit 274 have a high potential. As soon as the trigger circuit 239 is reset, the third input circuit of this "and" circuit also obtains a high potential by way of the conductor 241. This causes the central input circuit of the "and" circuit 277 to receive a high potential. Because the external synchronization is non-operative the conductor 220 has a high potential, and, in order to switch off the slow synchronization, the trigger circuit 250 is reset so that a high potential is applied to the conductor 251. The "and" circuit 280 then applies a high potential to the conductor 279 and the left-hand input circuit of the "and" circuit 277. The next fourth rapid synchronizing pulse, applied to the conductor 276 will then be able to pass the "and" circuit 277 and to set the trigger circuit 281. This starts, in the way already described, a cycle of the internal rapid synchronization system. A cycle of this system is then performed during which the contents of the second row of the core matrix is transferred to the register 352. Because the second programming wire $P_2$ is also connected to an input circuit 232 of the "or" circuit 230 a cycle of the slow synchronization is started as soon as the cycle of the rapid synchronization is completed. During this cycle by way of the wires 427, the "and" circuits 425, connected by way of conductor 426 to the programming wire $P_2$ and the "and" circuits 423, made conductive by the second slow synchronizing pulse $T_2$ applied to the conductor 424, the trigger circuits in the system 421 are set in accordance with the contents of the second row of the core matrix. These trigger circuits were previously reset by the slow synchronizing pulse $T_1$, which, because of the high potential of the programming wire $P_2$, applied to the upper input circuit of the "and" circuit 422, this once, is able to pass the said "and" circuit. At the end of the second slow synchronizing cycle, the relays 420 in the group 419 are set in accordance with the bits written on the second row of the core matrix. The slow synchronizing system remains inoperative for the rest of the setting so that the trigger circuit in the group 407 and 421 will no more be reset. Consequently the relays in the groups 409 and 419 which are excited during the first part of the setting operation of a row of units on the board remain excited for the rest of this operation. The relays in the group 409 control the contacts of the contact pyramid 411 and the relays in the group 419 control the contacts in the contact pyramid 418. The contact pyramid 411 connects one of the 10 horizontal conductors 416 of a relay matrix to one terminal of a source of current. The relay contact pyramid 418 connects one of the 10 vertical conductors 417 of the same matrix to the other terminal of the said source of current. Between each pair of wires the winding of a relay is connected. Between the horizontal wire 415 and the vertical wire 412 e.g. a relay winding 414 is connected. In order to prevent the closing of undesired parallel circuits in the matrix a diode such as 413 is connected in series with each relay winding such as 414. After the two relay groups 409 and 419 have been set only one relay in the relay matrix is excited. The relays in this matrix are the row selecting relays performing the selection of the row to be set of the display board in the way already described with reference to FIG. 5.

At the end of the second slow cycle the relay of the row to be selected is excited. Be it assumed that this relay is the relay which switches over the contacts 506 and 528. The system is then ready for controlling the setting of the display units of the selected second row. During this setting operation the slow synchronization circuit, which is only necessary for controlling the row selection should not become operative any more, because this would cause delay as well as resetting of the selection relays. In order to prevent such operation a trigger circuit 235 is present, which only in its reset condition applies a high potential to one of the input circuits of the "and" circuit 236 in order to permit this "and" circuit to pass the pulse $S_3$ which initiates the slow synchronizing cycle by setting the trigger circuit 239. The trigger circuit 235 is reset when, as will be elucidated later on, at the end of the complete setting operation of the board the trigger circuit 207 is reset in order to start the operation of the extraneous synchronization circuit. Only then is it possible for the slow synchronization circuit to be started. If, however, after the setting of the second set of relays 419 the 4th slow synchronizing pulse $T_4$ is applied to the input circuit 228 of the "and" circuit 233 while the programming wire $P_2$ connected to the input circuit 229, has a high potential, this pulse passes the "and" circuit, and sets the trigger circuit 235. No more slow synchronizing cycles can then be initiated by the selection of the first and second row of the core matrix because one of the input circuits of the "and" circuits 236 remains at a low potential.

In order to make preparations for the first of a number of comparison cycles following now during the last cycle of the slow synchronization circuit the trigger circuit 273 is reset. The high potential, which during the reading of the second line of the matrix is applied to the second programming wire $P_2$, reaches by way of the input circuit 270 the "and" circuit 272, thus permitting the third rapid synchronizing pulse $S_3$ which is applied to the input circuit 271 of this "and" circuit to reach the trigger circuit 273 and reset it. The object of the cycles following now is to establish whether certain display units have already reached their eventual position registered in the storage system. Such comparison cycles should be effected in the last part of the interval between two successive stepping pulses applied to the stepping magnets, when the code contacts, in any case, are at rest. Furthermore, the rapid internal synchronization system must be prevented from beginning a cycle before the slow internal synchronization has completed its last cycle in which it controls the setting of the relay group 419. The circuits connected to the "and" circuit 267 ensure that the above conditions are met. In the example described, the stepping pulses for the stepping magnets are obtained by rectifying an alternating current of 50 cycles per second. This current is supplied by way of conductor 260 to the rectifier 261. The pulses supplied by the rectifier flow, on the one hand, by way of the branch 259 to the conductor 503 and the various stepping magnets, and on the other hand, to the limiting circuit 262, which transforms them into substantially rectangular pulses. A differentiating circuit 263, these pulses and the pulse obtained by differentiation of the trailing edge of the pulse, occurring at the end of the interval of ten milliseconds in which a stepping pulse occurs, triggers a monostable trigger circuit 264 causing it to produce a pulse with a duration of five to seven milliseconds. This pulse is differentiated by circuit 265 and the pulse derived from its trailing edge triggers a second monostable trigger circuit 266 causing it to produce a very short pulse. This pulse is applied to the upper input circuit of the "and" circuit 267. It will, however, only be able to pass this "and" circuit if the two other input circuits have a high potential, that is if the trigger circuits 239 and 250 are reset. For the time being the trigger circuit 239 is set, however, because the same pulse $S_3$ which caused the resetting of the trigger 273 has set the trigger circuit 239 in order to start the slow synchronization system. This system now performs a cycle in the way described above during which the relay group 419 is set. The second slow synchronizing pulse $T_2$ in this cycle sets the trigger circuit 250. The pulse $T_3$ in the same cycle resets the trigger circuit 239, so that the conductor 268 connected with the "and" circuit 267 obtains a high potential. Nevertheless, the short pulses produced by the flip-flop circuit 266 will not be able to pass this "and" circuit, because, for the time being, the trigger 250 continues to apply a low potential to the conductor 251. If, however, the cycle is completed and the moment is reached at which the second pulse $T_2$ of the slow synchronization system in the next cycle would have been supplied, the trigger circuit 250 is reset again, so that the conductor 251 obtains a high potential, and the "and" circuit 267 can become conductive. The next short pulse received from the flip-flop circuit 266 then sets the trigger circuit 273 thus initiating a number of cycles of the rapid internal synchronization system, for the trigger circuit 273 will, for the time being not be reset again, as the input circuit 270 connected to the programming wire $P_2$ remains for the time being at a low potential during a complete programming cycle of the storage system 338. Because of the operation of the chain of elements connected to the upper input circuit of the "and" circuit 267 these cycles start long enough after the last stepping pulse for the parts of the display units to settle down and long enough before the next stepping pulse to permit a complete cycle of comparison operations for all units on the selected row to be performed before they take their next step.

Now a comparison cycle will be described. Be it assumed, that the selection relay, which switches over the contacts 506 and 528, is excited. The windings of the stepping magnets of the display units on the row of the display board to which the conductor 508 is allotted are then connected to the source of stepping pulses. The first pulse of the first cycle of the rapid synchronization switches the ring counter 315 over to position three and the signal passing through the "or" circuit 353 resets all trigger circuits in the register 352. At the moment of occurrence of the second rapid synchronizing pulse $S_2$ the contents of the third row of the core matrix is transferred to the register 352.

The programming wire $P_3$ has a high potential in the third position of the ring counter. It is connected to the upper input circuit of the "and" circuit 519, so that the second synchronizing pulse $S_2$, which is applied to input circuit 520, can reach the conductor 516 causing all trigger circuits (such as 501, 513, 513A . . .) for controlling the transistor switches in the circuits of the stepping magnets to be set.

This causes all transistor switches as 502, 514A, 514 to become conductive, so that the next stepping pulse can flow through the windings of the magnets. Only from this moment on are the changing contents of the flip-flop registers 352 able to influence the setting of the display units of the display board. Because of the instant in the stepping pulse cycle at which the first comparison cycle is started, no stepping pulse occurs for the time being. The conductor 533 is connected to the programming wire $P_3$ and consequently has a high potential when the counter is in its third position so that the "and" circuits $a$, $b$, $c$, $d$, $f$ and $g$ in the multiple wires 525 are conductive and the potentials applied to the multiple wires 525 by the code contacts of the code transmitter of the first display unit in the selected row are able to reach the code converter 536 by way of the "and" circuits mentioned above and the "or" circuits 532 while the contents of the third row in the matrix is stored in the register 352. The code converter converts the signals into signals in teleprinter code. The converted signals are applied to the comparison circuit 464 by way of the cable 537. This comparison circuit also receives, by way of the cables 430, 355, 354, the signal registered in the register 352. If no equality is established, nothing happens. If equality is established the comparison system applies a high potential by way of conductor 455 to the left-hand input circuit of the "and" circuit 457 so that the next third rapid synchronizing pulse $S_3$, which is applied to the input circuit 456 of the said "and" circuit will pass this circut and reach the right-hand input circuit of each of the "and" circuits 500, 512, etc by way of the conductors 458, 538, 517. The pulse received by way of these conductors will, however, only be able to pass that "and" circuit in the latter group of "and" circuits, the other input circuit of which is connected to the programming wire carrying a high potential at that moment. During the comparison cycle described this is the "and" circuit 500, so that the pulse received from the "and" circuit 457 resets the trigger circuit 501, which controls the supply of stepping pulses to the first column. The pulse, resulting from the established equality consequently can reset the trigger circuit 501 and block the transistor switch 502 before the first stepping pulse is supplied to the display unit.

During the next cycle of the rapid synchronization performed while the ring counter is in position four the upper input circuit of the "and" circuit 512 as well as the conductor 534 have a high potential, so that the "and" circuits in the group of multiple wires 526 apply the signal corresponding to the position of the second display unit in the selected row to the code converter by way of the "or" circuits 532. This causes the said signal to be compared with the setting of the register 352, which now corresponds to the contents of the fourth row of the core matrix. These comparison cycles are continued until the second row in the core matrix is reached again. All the registrations still present on lines on which no information is written during the reception of the last information are ignored because no corresponding display units are present on the selected row. As soon as the second row is reached again the programming wire $P_2$ applies a high potential to the input circuit 270 of the "and" circuit 272. Consequently, the next third rapid synchronizing pulse $S_3$ applied to the input circuit 271 of the said "and" circuit, is able to pass it and to reset the trigger circuit 273, which then applies a high potential to the upper input circuit of the "and" circuit 278 thus permitting the fourth rapid synchronizing pulse, received by way of the conductor 276, to pass this "and" circuit and to reset the trigger circuit 281. This puts an end to the operation of the rapid synchronization system S in the way described above. A short time later a stepping pulse is supplied, which causes all stepping magnets, the transistor switches 502, 514, 514A, etc. which are still conductive to be excited, so that their display units take a step. After a certain delay caused by the various circuit elements described above, but before the next stepping pulse is received the flip-flop circuit 266 supplies a short pulse again, which passes the "and" circuit 267 because the two trigger circuits 239 and 250 are still in the reset condition, and sets the trigger circuit 273. This initiates the next comparison cycle during which the comparison system establishes whether any of the display units by taking a step has reached its desired setting. As soon as it may be assumed, that all display units have reached the setting corresponding to the information stored in the matrix core memory, the operation of the system must be interrupted, and the external synchronization system made operative, so that information from the common channel may be received again. In the embodiment described this occurs as soon as it is established that during a certain comparison cycle the comparison system has in no case established inequality. For this purpose the system contains the switching elements shown in the lower part of FIGURE 4. The pulse $S_2$, which flows through the "and" circuit 519 and which sets the trigger circuits such as 501 for controlling the stepping pulses supplied to the stepping magnets, also flows through conductors 539, 447 to the trigger circuits 448 and 443. It resets the trigger circuit 448 and sets the trigger circuits 443. The latter circuit is reset as soon as the row in the storage matrix 338 is reached on which the clearance signal SL is written. When this signal is transferred to the flip-flop register 352, the code recognizer 357 applies a high potential to the upper input circuit of the "and" circuit 442 by way of conductor 359 and the cables 330, 428, 518, 429, so that the pulse $S_3$ is able to reach the trigger circuit 443 and to reset it. The voltage produced by the comparison circuit 464 as a result of this comparison operations is applied to an inversion circuit 454 which, at the moment a comparison is performed, applies a high potential to the conductor 446 if inequality is established. As long as the trigger circuit 443 is still in the set condition, i.e. as long as the line on which the clearance signal is written is not reached and therefore comparisons with significant registrations in the matrix storage are performed, this high potential will permit the fourth rapid synchronization pulse $S_4$ which is applied at the input circuit 444 of the "and" circuit 445 to pass this "and" circuit and to set the trigger circuit 448. If no inequality is established the trigger circuit 448 is still in the reset condition and the left-hand input circuit of the "and" circuit 449 still has a high potential when in this way all rows of the matrix storage on which significant signals are written have been selected and the row on which the clearance signal is registered is reached. Then the code recognizer 357, by way of output circuit 359, applies a high potential to the input circuit 450 of the "and" circuit 449, so that the third rapid synchronizing pulse, which is applied to the input circuit 451 will be able to pass this "and" circuit 449 and to set the trigger circuit 452. Obviously this is only possible if after a complete series of comparison cycles in which no inequality has been established, the row in the core matrix on which the clearance signal is registered is reached and moreover, the third rapid synchronization $S_3$ occurs. This pulse will then be able to pass the "and" circuit 449 and to set the trigger circuit 452 which, by way of output circuit 463, applies a high potential to the input circuit 204 of the "and" circuit 206. The second pulse $S_2$ in the next cycle of the internal rapid synchronization will then be able to reach the trigger circuit 207 and to reset it. This causes the conductor 209 and one input circuit of the "or" circuit 275 to obtain a high potential, so that the central input circuit of the "and" circuit 278 obtains a high potential, which, in the way already described, initiates the termination of the operation of the rapid synchronization system S at the end of the current cycle. The resetting of the trigger circuit 207 applies high potential by way of "or" circuit 275 to the upper terminal of "and" circuit 278, which, in the way described above, causes the stopping of the operation of the rapid synchronization system at the end of its cycle. It moreover causes one input circuit of the "and" circuit 211 to obtain a high potential, and as soon as the operation of the rapid synchroanization has come to an end, which can be derived from the fact, that the trigger circuit 286 is in the reset condition, the conductor 210 and the input circuit of the "and" circuit 211 connected to it, obtain a high potential too, so that the fifth external synchronizing pulse can reach the left-hand input circuit of the trigger circuit 214 by way of the "and" circuit 211 and set this trigger circuit. This causes the four "and" circuits 225 in the first four output circuits of the external synchronization system to become conductive. Moreover, the upper input circuit of the "and" circuit 217 obtains a high potential, so that the second external synchronizing pulse can pass this "and" circuit and set the trigger circuit 219. This trigger circuit, by way of conductor 221, causes the two "and" circuits 226 to become conductive, so that all the output circuits of the external synchronization system are able to supply pulses, and the display board is ready again for receiving information from the transmitter system.

It is the object of the trigger circuit 443 to restrict the search for the occurrence of inequality to the interval in which those rows of the matrix are read in which information has been written during the last reception of information. This prevents the setting of the trigger circuit 448 as the result of the application of a registration left behind on rows in the matrix in which, during the setting of a short line on the board, no new information has been written, to the comparison circuit 428 at a moment when the display board can not supply any information because no display unit is present in the selected row and the column corresponding to the said row in the matrix. As soon as the row in the matrix is reached on which the clearance signal is written, the code recognizer 357 applies a high potential to the conductor 359. This conductor passes through the programming cable 330, 428, 518, 429 to the upper input circuit of the "and" circuit 442. As soon as, under these circumstances, the third internal synchronizing pulse $S_3$ is applied to the input circuit 441, i.e. before the end of the cycle of the rapid synchronization in which the clearance signal was transferred to the flip-flop register 352 and before the fourth rapid synchronizing pulse can set the trigged circuit 448 because of the inequality established when the clearance signal is applied to the comparison circuit, the "and" circuit 442 becomes conductive and the trigger circuit 443 is reset. This occurs after every comparison cycle in which the position of display units on a row is compared with the registrations in the matrix. After the resetting of the trigger circuit 443, the "and" circuit 445 cannot become conductive any more and the trigger circuit 448 can no longer be set as a result of the establishment of inequality. The beginning of the next series of comparisons causes the trigger circuits 443 to be set again at the same moment as the trigger circuits such as trigger circuit 501, which control the stepping circuits.

The trigger circuit 452 should only be in the set condition after complete equality has been established. It must consequently be reset before the starting of the setting of another line of the board. In the example described, this is effected immediately after it is set as a consequence of the fact that by resetting the trigger circuit 207 it has completed its task. When the trigger circuit 207 is reset, the conductor 209 obtains a high potential. The potential of this conductor is applied to the "and" circuit 459 by way of conductors 302, 316 and the cables 330, 428, 518, 429. It is true, that the resetting of the trigger circuit 207 puts an end to the operation of the rapid synchronization system. However, this synchronization system completes its cycles and consequently still provides once again a pulse $S_4$, which is applied to the second input circuit of the "and" circuit 459, and thereby causes the trigger circuit 452 to be reset.

In the interval, however, during which the comparison cycles are performed, the trigger circuit 207 is set and the potential of the upper input circuit of the "and" circuit 459 is, therefore, low so that the synchronizing pulse $S_4$ has no influence upon the trigger circuit 452.

Figure 5:
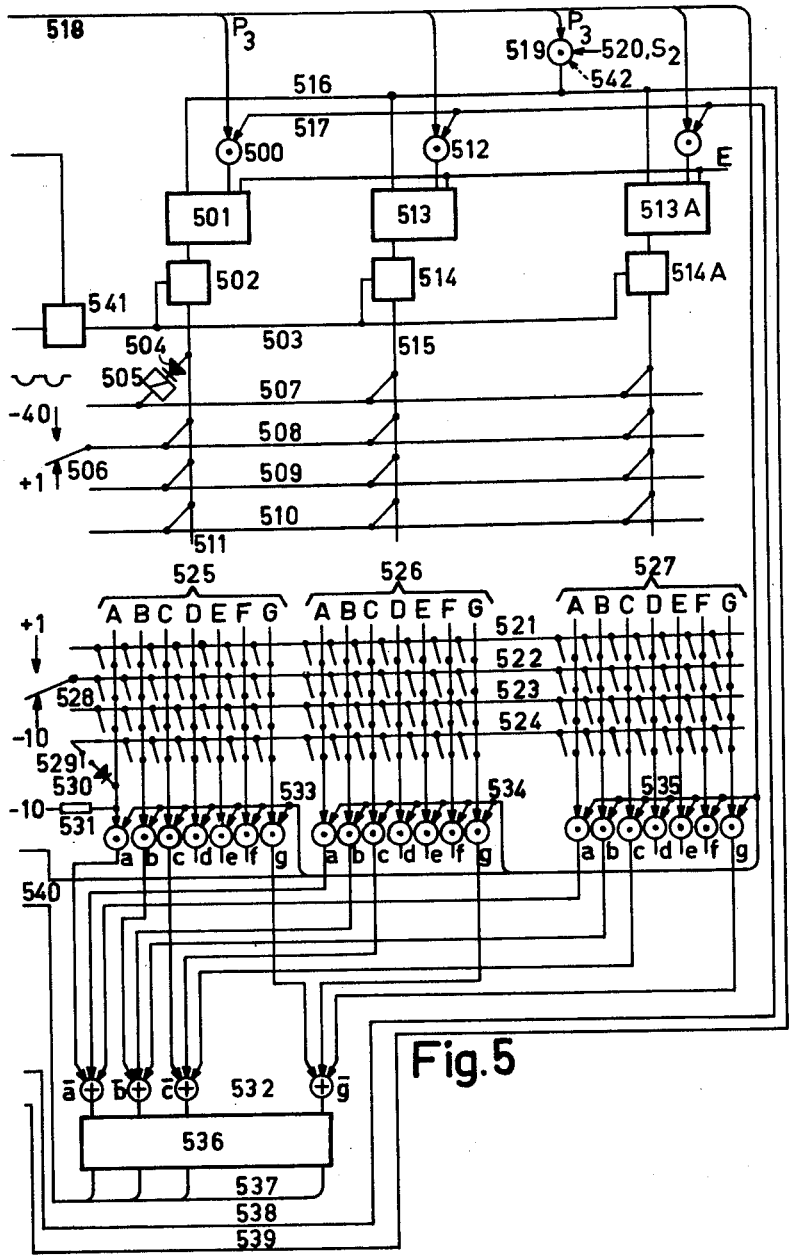

The pulse, which is applied by the trigger circuit 452 to the output circuit 463 is also applied to the wire with the index E in FIGURE 5 and causes, in this way, the resetting of the trigger circuit 501, etc., which were not reset during the previous series of cycles. These trigger circuits are the circuits allotted to columns in which, on the selected row, no display units are present. In this way, it is prevented that, in the future while setting a longer line, the display units in the said columns will start too early. The said wire E is connected to "or" circuits in the control circuits for resetting the said trigger circuits.

If for some reason a display unit cannot reach the required position, or is unable to send back the code elements corresponding to its setting, a cycle during which no inequality is established, will never occur. The system then continues to operate and to effect comparison cycles. In the system described, special measures are taken for giving an alarm under these circumstances. For the purpose of giving an alarm signal under these circumstances, a bistable trigger circuit 433 and a monostable circuit 436 are present. The trigger circuit 433 is set by the fifth extraneous synchronizing pulse, which is applied to one of the input circuits of the "and" circuit 431 if, at the same time, the potential of the other input circuit of this "and" circuit receives a high potential from the code recognizer 357, by way of the conductor 359, because this recognizer has established that the signal SL has been registered in the flip-flop storage 352, that is, when the transmission of information to the display board has just been completed and the board can start the setting of its units. Only under these circumstances can this trigger circuit be set. It is reset after a very short interval when the second line in the magnetic matrix storage is selected again. Before this occurs, however, the monostable trigger circuit 436 is set by the combined influence of the high potential applied to the input circuit 434 of the "and" circuit 435 by the first programming wire $P_1$, when the first line in the matrix storage is selected and the high potential applied to the upper input circuit by the trigger circuit 433 in the set condition.

The monostable trigger circuit 436 resets itself after an interval which is long enough for the normal setting operation of a row of the display board to be effected. An alarm signal is given at the output circuit 438 of the "and" circuit 437 when the following conditions are met:

(1) The trigger circuit 436 is reset, which means that the setting of the row should be ready.

(2) The trigger circuit 448 is set, which means, that during the last comparison cycle inequality has been established.

(3) The pulse $S_3$ is applied to the input circuit 440 of the "and" circuit, which means, that comparison cycles are performed.

(4) The code recognizer 357 applies a high potential by way of line 359 to the input circuit 439 of the "and" circuit, because a comparison cycle has just been completed.

The last condition prevents an untimely alarm.

Figure 2:
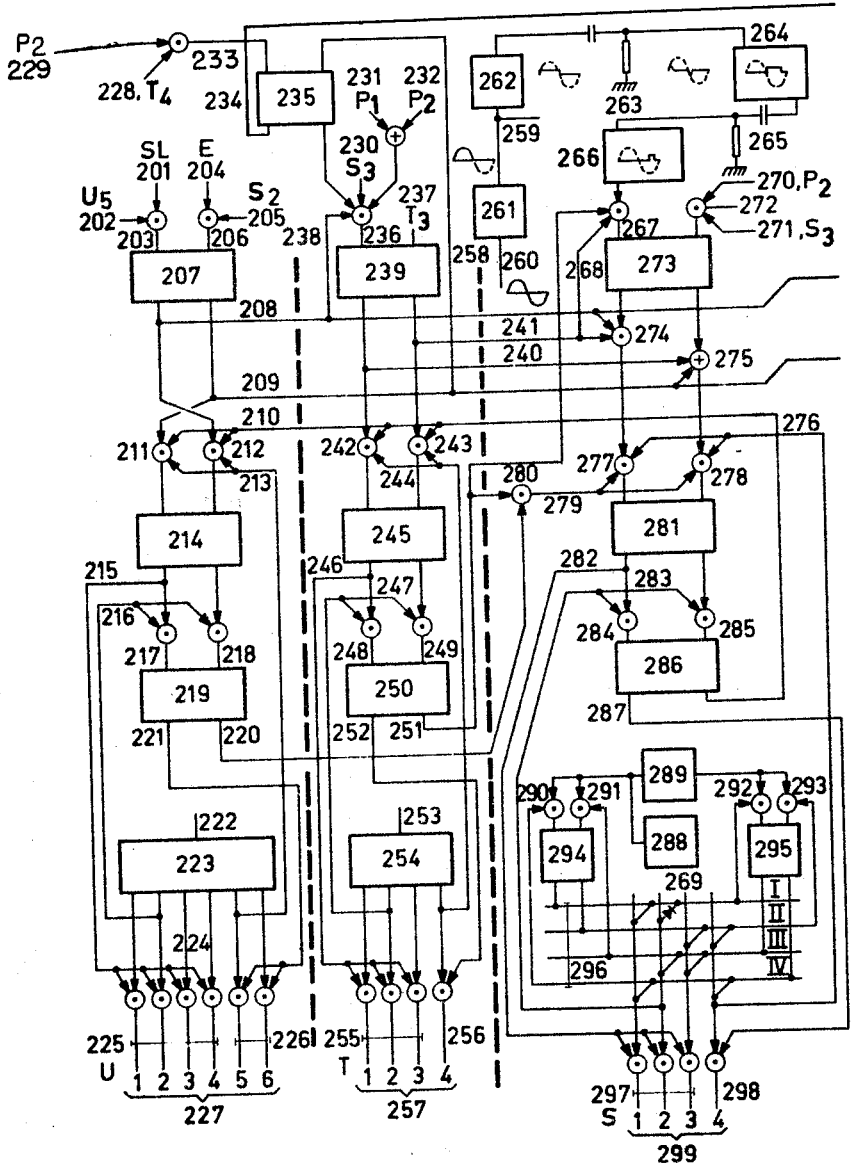

The way in which the synchronizing pulses are generated will be elucidated by describing the system for supplying the rapid internal synchronizing pulses, which is shown in detail in FIGURE 2. A relaxation generator 288 generates pulses. The duration of these pulses is equal to the duration of the pulse interval.

Be it assumed, that at a given moment, the two trigger circuits 294 and 295 are in the reset condition, and that, at that moment, the generator 288 produces a pulse. The conductor 296 IV has a high potential at this moment because trigger circuit 295 is in the reset condition, so that the said pulse will be able to set the trigger circuit 294 by way of the "and" circuit 290. This causes the conductor 296 I and the left-hand input circuit of the "and" circuit 292 to obtain a high potential. During the pulse interval, the inverter 289 applies a high potential to the upper input circuit of this "and" circuit so that the trigger circuit 295 is set. This causes the conductor 296 III as well as the right-hand input circuit of the "and" circuit 291 to obtain a high potential. The next pulse received from the relaxation generator 288 will then be able to reset the trigger circuit 294 by way of the "and" circuit 291. During the next pulse interval, the inverter 289 produces a pulse, which is able to pass the "and" circuit 293 and to reset the trigger circuit 295, because the right-hand input circuit of the said "and" circuit is connected to the conductor 296 II, whose potential is high as a result of the resetting of the trigger circuit 294. The original condition of the system is then restored. These cycles are continuously repeated. The conductors 296 I, II, III and IV are arranged in a matrix with the wires 269/1, 2, 3, 4, by way of which the synchronizing circuit supplies its pulses. Each conductor in the group 296 is connected by way of two diodes arranged as an "and" circuit with two of the conductors in the group 296. During the presence of the first pulse described above, the conductors 269 I and IV have a high potential causing the first conductor in the group 269 to obtain high potentials. In the first pulse interval, the conductors I, III in the group 296 have a high potential, so that conductor 2 in the group 269 obtains a high potential. During the second pulse interval, the conductors II, III in the group 296 have a high potential, causing the conductor 3 in the group 269 to obtain a high potential, and in the second pulse interval the conductors II, IV in the group 296 have a high potential, causing the conductor 4 in the group 269 to obtain a high potential. It is obvious, that the "and" circuits in the matrix are not shown completely and that, for instance, the resistances by means of which the wires in the group 269 are connected to a voltage source are not shown.

Figure 6:
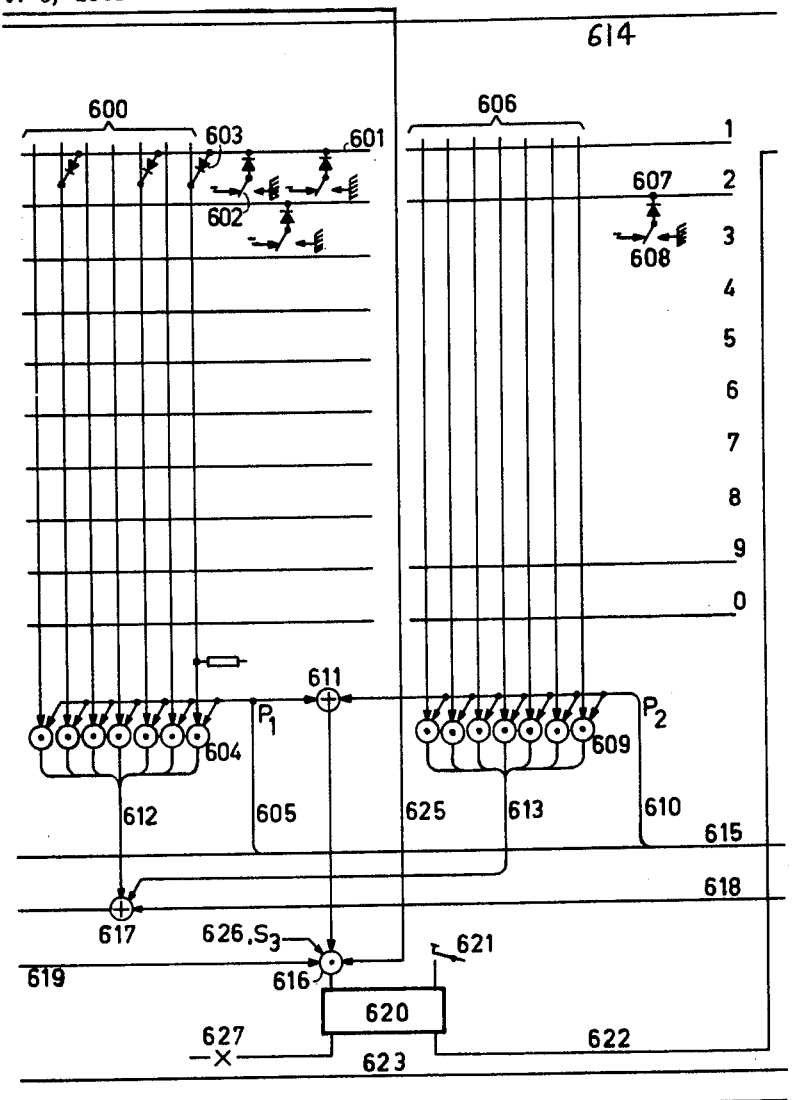
FIG. 6 shows a checking system for the group selection.

The circuits used for establishing whether the various display units have already reached their desired positions can also be used in order to establish in similar comparison cycles whether the selection of the line has actually been effected correctly. A system in which such a check on the selection is effected, is obtained if in the complete circuit FIGURE 6 is inserted between the FIGURES 4 and 5. The cable 614 carries the various programming wires to the cables 518 in FIGURE 5, while the cable 615 is the continuation of the cable 518. The cable 618 is the connection between the comparison circuit 464 and the cable 540 to which signals in teleprinter code are applied by the code converter 536. The conductors 623 and 624 are the continuations of the conductors 538 and 539 in FIGURE 5. By means of the system shown in FIGURE 6, the excited row selecting relay transmits back the two figures by means of which it was selected. This is effected by means of two matrices. Each of these two matrices signals back in teleprinter code one of these figures. Each matrix possesses ten horizontal wires such as 601 or 607. Each of these wires is allotted to one of the figures 0–9. Each of the row selecting relays possesses two special contacts for signalling back its member. The back side of such a contact is connected to a negative potential and the front side to zero potential. One of these contacts of a row selecting relay is connected by way of a diode to that wire in the matrix shown at the left-hand side of the figure, which is allotted to the first figure or digit in the number by means of which the relay was selected. The other contact is connected by way of a diode to that wire in the second matrix, which is allotted to the second figure in the said number. If, e.g., the relay 12 is selected it switches over the contacts 602 and 608. The contact 602 connects, in the left-hand matrix which must transmit the first figure, the wire 601, which is allotted to the figure 1, to ground. The diodes between this wire and the other contacts connected to this wire block the path to negative potential. The contact 608 connects in a similar way zero potential to the conductor 607 which is allotted to the figure 2 in the other matrix. The vertical wires in these two matrices correspond to the bits in the signals to be transmitted. The first five conductors determine the five significant bits which indicate the figure to be transmitted, while the sixth wire transmits the shift-key signal (in this case an unvariable bit and always indicating: figures). The seventh wire effects the transmission of the seventh or parity element used for checking purposes. Each of the horizontal wires in the matrix is connected by means of a diode such as 603 to each of the vertical wires allotted to the bits which must be of a certain type, e.g. 1 for the transmission of the figure to which the said horizontal wire is allotted. The vertical wires are connected by way of resistances not shown in the figure to a source of negative potential, so that the diodes connected to such a wire form an "or" circuit. As soon as a line selecting relay is excited the bits to be transmitted in order to signal back the number of this relay appear at the input circuits of the groups of "and" circuits 604 and 609.

In order to elucidate the operation of the checking system, a concise description will now be given of the operation of the display board when it includes the circuit shown in FIGURE 6. The writing of the information in the core matrix storage is effected in the way already described above. Because the rapid synchronization is non-operative during this writing, neither the setting circuits for the display units nor the checking system can become operative. Then the ring counter, controlled by the rapid synchronization, passes over all the rows in the matrix storage in which no information is written, after which the selection relay groups 409 and 419 are set. This causes the row selection relay to be excited. During all these operations effected before the row selection relay is excited, the two matrices still supply bits which do not correspond to the selection to be performed. The bistable trigger circuit 235 is, however, during all these operations, in the reset condition, so that the input circuit 625 has a low potential and the "and" circuit 616 cannot become conductive, so that the checking circuit shown in FIGURE 6 remains inoperative, as will be shown later. At the end of the slow cycle, during which the second set of selecting relays is set the trigger circuit 235 is set, as has been described above. This causes the slow synchronization system to remain inoperative during the rest of the setting operations of the system, while, moreover, the input circuit 625 of the "and" circuit 616, which is connected to the conductor 234 in FIGURE 2 obtains a high potential. This makes the checking circuit of FIGURE 6 operative.

As has been described above, after these selection operations, the rapid synchronization system is put into operation again so that a series of comparison cycles is performed. During these cycles, first the settings of the display units are compared with the signals stored in the matrix storage. Then the ring counter 315 passes over all the rows on which no information has been written and stops on row two of the matrix because of the fact that the operation of the rapid synchronization system is interrupted in the way described above. When near the end of the first series of comparison cycles, the first line, on which the first figure of the indication of the row on the display board is written, is read, the first programming wire $P_1$ obtains a high potential, so that the conductor 605 and all the right-hand input circuits of the "and" circuits 604 obtain a high potential. The potentials, indicating the bits of the first figure which are applied to the vertical wires 600 of the left-hand matrix by the switching over the contact 602 of the row selecting relay will then be able to pass the "and" circuits 604 and reach the comparison circuit 464, by way of the cable 612 and the "or" circuit 617. If the selection has been correctly effected, the comparison circuit 464 applies a high potential to the conductor 455. This high potential is applied by way of "and" circuit 457 and conductor 458 to the "and" circuits such as 500 connected to this conductor, this has no effect, because no programming wire applies a high potential to the second input circuit of any of these "and" circuits. Inversion circuit 454, moreover, applies a low potential to the conductors 460 and 619 as long as the conductor 455 has a high potential, so that the "and" circuit 616 cannot become conductive. If, on the other hand, the signal supplied by the left-hand matrix does not correspond to the signal written on the first line of the ring matrix storage, which signal at that moment is registered in the flip-flop register 352, then the output circuit 455 of the comparison circuit 464 remains at a low potential, so that the output circuit of the inversion circuit 454 applies a high potential to the conductor 619 and the left-hand input circuit of the "and" circuit 616. The programming wire 605 also has a high potential, so that, by way of the "or" circuit 611 the upper input circuit of the "and" circuit 616, obtains a high potential. The right-hand circuit 625 also has a high potential because, during the rest of the operations performed by a system, the trigger circuit 235 is set, so that its output circuit 234 applies a high potential to the input circuit 625. When under these circumstances the left-hand input circuit 626 receives the third rapid synchronizing pulse $S_3$. This pulse is able to pass the "and" circuit and to reach the trigger circuit 620. As long as the system is operating correctly, this trigger circuit is in its reset condition, because it is reset by means of a press button contact 621 when a defect has been repaired. An incorrect selection, however, causes the trigger circuit 620 to be set again. This causes the conductor 622 to obtain a low potential, so that the electronic switch 541, situated in the stopping pulse supply conductor 503, becomes non-conductive. In spite of the incorrect selection the setting of the incorrectly selected row will consequently remain uncharged. During the reading of the second row the programming wire 610 obtains a high potential, so that the right-hand input circuits of the "and" circuits 609 obtain a high potential, and the bits of the signal which are applied to the vertical wires 606 of the right-hand matrix, by way of the contact of the row selecting relay, are applied, by way of cable 613 and the "or" circuit 617, to the comparison circuit 464. By way of the "or" circuit 611, a high potential, applied to the programming wire $P_2$, is also applied to the upper input circuit of the "and" circuit 616, so that, in a similar way, as in the case of the first row, during the reading of the second row an incorrect selection of the row selecting relay causes the setting of the trigger circuit 620. In this case also the change of the setting of the selected row is prevented. The high potential, applied to the left-hand output circuit of the trigger circuit 620 after its setting, causes an alarm signal 627 to be made operative. The setting of the trigger circuit 620 does not prevent the system from effecting a number of comparison cycles. The display units, however, do not receive stepping pulses any more, so that a cycle in which no inequality is established will never occur. After a suitable delay, the alarm circuit with the monostable trigger circuit 436 will then become operative.

Figure 7:
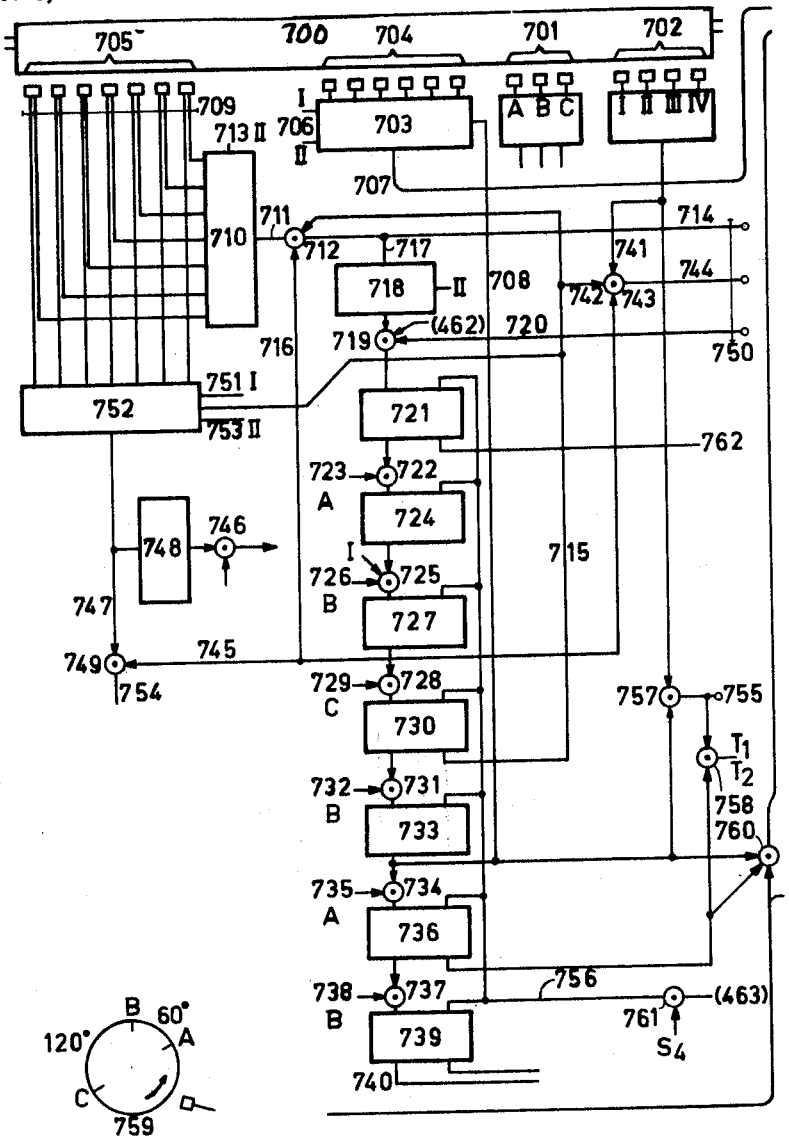
FIG. 7 shows a magnetic drum memory system to be used in a display board according to the invention.

The application of the invention is not restricted to the control of the setting of a display board by means of a core matrix storage device. The information concerning the desired setting of the display board may also be stored temporarily in a magnetic drum storage device. FIGURE 7 shows schematically, in block diagram form, an embodiment of the storage part of a system according to the invention in which a magnetic drum storage device is utilized. This storage device comprises a drum 700, which is rotated around its axis with a rotational speed of e.g. 3,000 rotations per minute. The information related to the setting of the display unit in a certain column of the display board is registered on a certain straight line on the drum. Only a part of the surface of the drum is used for storing this information. Immediately after this part of the drum has passed under the magnetic head, fixed registrations on the drum control the generation of a stepping pulse. Such a pulse is maintained during half a rotation of the drum. Then follows an interval corresponding to ⅛ of the duration of one rotation of the drum during which the various parts in the display units have time to settle to the state of rest. Then the first line containing a registration of information appears under the magnetic heads. Just as in the first example, signals with seven bits are received for the purpose of controlling the setting of the display units. The bits of these signals are registered on seven circular tracks, which pass under the magnetic heads 705. A second set of magnetic heads 704 controls the programming. These heads cooperate with fixed registrations on the drum. On each line on which a signal for controlling the setting of a display unit is registered a fixed registration is present indicating the column in which the unit to be set is situated. If a certain line is under the heads, these heads read simultaneously the signal indicating the desired setting as well as the number of the column in which the unit to be set is situated. The drum, moreover, possesses seven tracks with fixed registrations, read by the same number of heads, which supply the various synchronizing pulses for the system. The indication of the display unit to be set and the desired setting of this unit, received from the drum storage are temporarily stored in flip-flop registers, included in the circuits 703 and 752. This is effected successively for all the units on the selected row of the board. During the interval during which the data for the setting of a unit in a certain column are transferred to these registers, four successive synchronizing pulses, received from the magnetic heads 702 I, II, III and IV are successively applied to four conductors. They divide the said interval in to four partial intervals. These synchronizing pulses control the operation of the system in a similar way as the rapid synchronizing pulses of the first embodiment. Furthermore the drum possesses three synchronization tracks with fixed registrations producing one pulse per rotation of the drum. These tracks cooperate with the heads 701 A, B, and C. The magnetic head A produces a pulse when the line on the drum on which the first registration is stored, is removed 1/8 of a rotation from the heads. The magnetic head B produces a pulse when the said line nearly has reached these heads and the magnetic head C produces a pulse as soon as the part of the circumference of the drum on which information has been stored has passed the magnetic heads. The moment of occurrence of the pulses may be derived from the detail 759 on FIGURE 7. In the following description of the operation of the system reference will be made to diagram which consists in the FIGURES 7, 4, 6 and 5 arranged side by side in this order from left to right. Be it assumed that the drum is rotating, that the last setting of the display board has been completed and that the transmitter is calling the display board by sending its call-signal over the common channel 750 in order to provide it with information related to a new setting. The system is in its quiescent condition. This means that the trigger circuits 721, 724, 727, 730, 733, 736 and 739 are all in the reset condition as will be described below. The call signal is applied to the display board circuit through seven conductors in the common channel 750 It is unable to reach the writing circuits of the drum for the seven "and" circuits 712 cannot pass them at that moment, because the conductor 716 has a low potential The bits of the signal, however, are able to reach by way of the cable 717 the code recognizer 718, which, if the signal received is actually the call-signal of the display board described, applies a high potential to the upper input circuit of the "and" circuit 719. The call-signal is, however, also used in normal traffic and in order to prevent this signal, when used in normal traffic to start the operation of any display board, the "and" circuit 719 is normally blocked. When the signal is used as a call-signal, however, the distant sender, by way of conductor 720 in the common channel applies a high potential to the right-hand input circuit of the "and" circuit 719, so that, in this case and in this case only, the trigger circuit 721 is set after which applies a high potential to the upper input circuit of the "and" circuit 722. The pulse, generated by the magnetic head A is applied to the input circuit 723 of the said "and" circuit 722. The first A pulse generated after the setting of the trigger circuit 721 will consequently set the trigger circuit 724. As soon as the registration area on the drum is reached the head 701B generates a pulse which is applied to various circuits including the conductor 726. Because the trigger circuit 724 is set at that moment and the upper input circuit of the "and" circuit 725 has a high potential, the B pulse is able to pass the "and" circuit 725 and to set the trigger circuit 727. This trigger circuit then applies a high potential to the wire 745 and the lower input circuit of the "and" circuit 743 so that the synchronizing pulses received from the heads 702, by way of the "and" circuits 743 and the four wires 744 in the comman channel are passed to the transmitter, which reads to them by transmitting its information in the rhythm of the drum circuit, determined by the received synchronizing pulses. The situation of the fixed registration on the drum makes sure, that this operation always starts at the beginning of a cycle. If necessary, the "and" circuit 725 may be provided with a third input circuit to which the pulse 702 I is applied. Because the trigger circuit 727 is in the set condition and the trigger circuit 730 in the reset condition both wires 715 and 716 have a high potential, so that the bits which are received through the seven wires 714 in the common channel and applied to the seven "and" circuits 712 are able to reach the writing amplifier 710. The writing moment is determined by the synchronizing pulse 702 II which is applied to the input circuit 713 of the writing system. All data, including the clearance signal, are then written on the storage drum, just as in the core matrix storage of the first embodiment. The clearance signal in this case is only used to indicate the end of the information received. It is not required for starting the further operation of the system, for the drum rotates continuously and, if certain trigger circuits such as 727 have been set, it automatically starts the next phase in the operation. As soon as the end of the registration area on the drum has been reached, the magnetic head 701C produces a pulse. This pulse sets the stepping pulse trigger circuit, which is not shown in FIGURE 7. When this trigger circuit is set, a stepping pulse voltage is applied by way of an electronic device controlled by this circuit to the display board. The display board is, however, still not in the setting phase and the stepping pulse generated immediately after the writing has been completed does not reach the stepping magnets. The pulse generated in the magnetic head 701C is moreover applied to the input circuit 729, and because the trigger circuit 727 is in the set condition, it sets, by way of the "and" circuit 728, the trigger circuit 730. This causes, in the first place, the conductor 715 to obtain a low potential, so that the "and" circuits 712, which join the writing amplifier 710 to the common channel, are blocked. Furthermore, the "and" circuits 743 are made non-conductive, so that no more synchronizing pulses are sent to the transmitter. For the time being the system is consequently unable to receive information from the common channel. As soon as the drum has reached the beginning of the storage area again, a pulse is produced by the magnetic head 701B which is applied to various circuits including the input circuit 732 and, because the trigger circuit 730 is set, it is able to pass the "and" circuits 731 and to set the trigger circuit 733 which applies a high potential to the conductor 708 so that, in the first place, the "and" circuits 757 become conductive for the synchronizing pulses generated in the four heads 702. These pulses are then applied by way of conductors 755 as rapid synchronizing pulses to the various parts of the system. These pulses replace the rapid synchronizing pulses supplied by the output circuits 299 in the embodiment previously described. Furthermore, because of the high potential applied to the conductor 708, the six trigger circuits in the system 703 become able to react to the pulses generated in the six magnetic heads 704. The first synchronizing pulse I, which is applied to the input circuit 706 I resets all the trigger circuits in the system 703, while the synchronizing pulse II which is received by way of the input circuit 706 II, permits the trigger circuits to react to the pulses generated in the six magnetic heads 704, which set them accordingly. For this purpose, the pulses generated in the heads 704 flow by way of "and" circuits possessing an input circuit connected to the wire 708 and an input circuit connected to the wire 706 II.

When a line on the drum upon which the setting of the display unit in the selected line and a certain column of the selected line is scanned, pulses received from the head 704 set the trigger circuits in the programming system 703 in such a way, that they indicate in the code used for this purpose the column in which the said display unit is situated. The six bits received from the drum can be arranged according to sixty-four different signals. This means, that a selection can be made out of sixty-four positions. Be it assumed that the display board possesses no more than one hundred rows and that each line contains no more than forty display units. The programming circuit must then be able to select one out of forty-two programming wires. Two of these wires are used for the selection of the line on the board, while the other forty wires each indicate a column of the display board. For this purpose the programming system 703 must be able to select a distinct programming wire for each of the permutations of the settings of the trigger circuits in the register in this system. This is effected in a well-known way by means of a matrix circuit possessing forty-two programming wires in one direction and in its other direction two wires for every trigger circuit, one of these wires having a high potential if the trigger circuit is set and the other if the trigger circuit is reset. Each programming wire is connected, by means of diodes arranged according to an "and" circuit to six wires from the trigger circuits. If, for the selection of a certain programming wire, a certain trigger circuit must be set, then the said programming wire is connected, by way of a diode to the wire, which obtains a high potential when the said trigger circuit is set. If, on the other hand, the said trigger circuit must be reset, then the other wire from the said trigger circuit is connected to the said programming wire by means of a diode. After the wire 708 has obtained a high potential as a result of the setting of the trigger circuit 733, during the scanning of a line on the drum, the programming system applies a high potential to the programming wire corresponding to that line and comprised in the cable 707. This may be a wire indicating a display unit, the setting of which is stored on the said line. It may also be the programming wire, which controls that part of the row selection operation the data for which are stored on the said row. During the following rotation of the drum only the row selection is effected, because, as will be shown later on, the comparison circuit is still inoperative. The line selection is effected by means of a circuit which in principle is the same as the circuit shown in the upper part of Figure 4. Slow synchronizing pulses are not produced, however, because the rotation of the drum after the setting or resetting of the trigger circuits in the system 407, 421 leaves time enough for the relays in the systems 409 and 419 to rearrange their armatures in accordance with the new selection. Instead of the pulses $T_1$ and $T_2$, the normal synchronizing pulses received from the system 756 are applied to the "and" circuits 408 and the wire 405 in order to set or reset the trigger circuits in the system 407. These pulses are, however, also supplied after the selection has been effected, so that special measures must be taken for preventing these pulses from reaching the said circuit elements any more after the selection has been made. For this purpose the pulses which are to replace the slow synchronizing pulses are not received directly from the output circuit 755, but by way of an "and" circuit 758, which is conductive only as long as the trigger circuit 736 is in its reset condition.

After the selection has been effected, in the way described above, the synchronizing pulses C and A are generated again by the heads 701 C and A. The latter pulse is applied to the input circuit 735 and sets the trigger circuit 736 by way of the "and" circuit 734 which is conductive because the trigger circuit 733 is in the set condition. This puts an end to the supply of synchronizing pulses to these parts of the circuit, which in the first embodiment react to the slow pulses. As soon as the beginning of the storage area is reached, a pulse is generated again by the head 701 B, which pulse is applied to various circuits including the input circuit 738 of the "and" circuit 737. The said pulse passes this "and" circuit and sets the trigger circuit 739 because the trigger circuit 736 is in its set condition and applies a high potential to the upper input circuit of 737. The setting of the trigger circuit 739 initiates the comparison cycles, for which purpose it applies a high potential to the conductor 740. It is remarked that the control circuits for the rest of the setting operations of the display board substantially correspond to those shown in FIGURES 4 and 5. The said high potential of the wire 740 is applied to the left-hand input circuit of the "and" circuit 461, which in this embodiment is inserted in the connection 455. This causes the comparison circuit to become operative. Furthermore, this high potential is applied to an extra input circuit 542 of the "and" circuit 519 so that, only after the setting of the trigger circuit 739, stepping pulses can reach the stepping magnets. During the following rotation of the drum, the trigger circuits in the reading amplifier 752 are successively set in accordance with the registered signals. For this purpose the first synchronizing pulse I applied to the input circuit 751 I resets all trigger circuits in the reading amplifier while the second synchronizing pulse, applied to the input circuit 753 II, connects the trigger circuits in a similar way as in the programming circuit 703 to the magnetic heads in order that they may be set in accordance with the registrations scanned. During the rest of the interval between two succesive lines on the drum, such a signal remains stored in the trigger circuits. By way of the cable 747 and the "and" circuit 749 and the cable 754 these signals are supplied to the cable 430 and the comparison system 464. The programming circuit 703, in the way described above, determines the display unit, the setting of which is applied to the comparison circuit at the same moment. The settings of all display units are now successively compared with the signals stored in the drum storage. This is effected completely in the way described in connection with the first embodiment. If the registration on the drum corresponds to the setting of a unit to be set, then a trigger circuit, such as 501, is reset. The display unit in the said column will then receive no stepping pulses any more. After the complete cycle of comparisons has been effected, the drum reaches the end of the storage area so that a pulse C is generated which initiates a stepping pulse. This pulse causes the units, the trigger circuits, such as 501, of which still are in the set condition, to take a step. The pulse is terminated by the occurrence of pulse A after which the code contacts in the units have time to settle. During the next rotation of the drum, another series of comparison cycles is performed. The series of comparison cycles are interrupted as soon as all display units have reached their desired settings. This is effected also in thise case by means of the trigger circuits 434 and 448. Moreover, also in this embodiment, an alarm signal is given, by means of the mono-stable trigger circuit 436 and the bi-stable trigger circuit 433, if the correct settings are not reached in due time. If it is desirable for the row selection to be checked, FIGURE 6 is inserted between the FIGURES 4 and 5. The input circuit 625 of the "and" circuit 616 is, in this embodiment, connected to the left-hand output circuit of the trigger circuit 736 so that the checking operations cannot be started before the selection has been effected. Just as in the first embodiment, the checking operation of the selection is repeated in each series of comparison cycles.

In this second embodiment, some special measures are required because of the different construction of the programming and synchronization arrangements. The trigger circuit 433 must be set when, at the end of the reception of information, the release signal is received. In this second embodiment, however, the reception interval during which information is received cannot be characterized by a special external synchronizing pulse. Consequently, the "and" circuit 433 must react to the fourth synchronizing pulse supplied by the magnetic head 702 IV, instead of to the external synchronizing pulse $U_5$. The fact that the release signal was established during a reception interval is made known in this embodiment by two extra input circuits of the "and" circuit 431, one of these connected to the conductor 742 and the other to the conductor 715.

It is furthermore impossible for the trigger circuit 452 to put an end to the setting operations by switching off the synchronizing circuit in the way described for the first embodiment. In the second embodiment this trigger circuit resets all trigger circuits in FIGURE 7 by way of the conductor 463. The synchronization system does not dispose of means which ensure the completing of a cycle, and, for this purpose, the connection for the resetting mentioned above comprises the "and" circuit 761 which reacts to the fourth synchronizing pulse. The resetting of the trigger circuit 452 canot be made dependent on the starting of the external synchronizing system. The upper input circuit of the "and" circuit, therefore, receives a high potential from the output circuit 762 of the trigger circuit 721.

In order to prevent the reception of a call before the trigger circuit 452 has been reset, the "and" circuit 719 possesses an input circuit connected to the conductor 462 and the code recognizer 718 is only able to recognize a call sign during the presence of the second synchronizing pulse. It is remarked that the reading circuit 752 automatically reacts to the received signals. The connection to the wire 715 then causes a reduced sensitivity. The code recognizer 748 is used to recognize the clearance signal and is operative also during the reception. It then applies a high potential to the output circuit 746.

The above system according to the invention has only been described for a display board whose units are driven by stepping magnets. It is obvious that the system can also be used with boards the display units of which are driven mechanically. An example of such a display board is described in the Belgian patent specification 560,106. In this case a coordination must be established between the mechanically driven parts of the system and the electrical circuits. In a system according to FIGURE 7, this can be effected in a very simple manner by combining the mechanical driving systems of the display board and the drum or by driving both devices by synchronous motors connected into the same source of alternating current. In the system of the type described first the coordination can be effected in various ways. In a special embodiment the display units are driven by a synchronous motor and the alternating voltage feeding this motor is also applied to the rectifier 261 in FIGURE 2, which automatically ensures the coordination. In another embodiment the mechanically drving system of the display units drives an interrupter producing pulses which are used instead of the pulses produced by the pulse shaper 262 in the first embodiment. These pulses occur during the stepping of the unit. They are applied to the circuit 263 which caused the coordination to be effected.

What we claim is:

1. A system for simultaneously setting a plurality of movable elements, each of said movable elements including position-indicating means for indicating the actual positional setting of the movable elements; and a pulse-responsive driving electromagnetic means for step-by-step setting of the movable element, said driving electromagnetic means including an electromagnetic winding, said system comprising:

a source of electrical stepping pulses:

a plurality of controlled switching means for selectively connecting said source of electrical stepping pulses to each of said electromagnetic windings respectively;

a plurality of signaling-back means, each of said signaling-back means being responsive to the position-indicating means of one of said movable elements, respectively, for generating position-indicating signals in coded form representing the actual position of the associated movable element;

a magnetic storage means including a plurality of storage register for storing signals in coded form representing the desired position of each of said movable elements, respectively.

a comparison means including a first input means for receiving the signals stored in said magnetic storage means and a second input means for receiving the signals from said signaling-back means, said comparison means including output means for generating an equality control signal when the signals received at said first and second input means represent the same position; a plurality of controlled gating means for connecting each of said signaling-back means to the first input means of said comparison means;

and sequential programming means including means for simultaneously selecting from said magnetic storage means and transferring to the second input means of said comparison means the signals from a storage location associated with a particular movable element and energizing the controlled gating means associated with said particular movable element so that said comparison means compares the signal representing the desired position and the signals representing the actual position of said particular movable element;

each of said controlled switching means being connected to the output means of said comparison means and said sequential programming means to prevent the further transmission of stepping pulses from said source of stepping pulses to the electromagnetic winding of its associated movable element when the output means of said comparison means generates an equality control signal resulting from the comparison of the signals representing the desired and actual positions of the associated movable element.

2. The system according to claim 1, wherein each of said controlled switching means includes a bistable circuit means including means for establishing a connection between said source of electrical stepping pulses and the electromagnetic winding of the associated movable element when the bistable circuit means is in a first state and for opening said connection when the bistable circuit means is in a second state, each of said bistable means including first and second input means for receiving signals to trigger the circuit means to the first and second states, respectively, said second input means being connected to said comparison means and said sequential programming means, and said system further comprising means for initially transmitting a signal to the first input means of each of said bistable circuit means.

3. The system according to claim 1, further comprising a signal code converter means connected to one of the input means of said comparison means for converting the coded form of the signals transferred to said one input means to the coded form of the signals received at the other input means.

4. In a system for simultaneously setting the movable elements of a group of such elements, a plurality of such groups of elements, a separate electronic step-by-step driving mechanism for each movable element, a driving electromagnetic winding in each step-by-step driving mechanism, a common pulse source for controlling simultaneously the supply of pulses to the electromagnetic windings in the driving mechanisms of movable elements to be set simultaneously, a common pulse line for each group, means for connecting said common pulse supply line to one end of the driving electromagnetic windings of the group, a group-selecting means for connecting one of said common pulse supply lines to said common pulse source, a common pulse supply conductor for each set of movable elements which have corresponding positions in the various groups, means for connecting the other ends of the driving electromagnetic windings of the set to said conductor, and electronic switch in each pulse supply conductor for starting and stopping the pulse supply to said conductor, and a separate control means for each of said electronic switches, a plurality of signaling-back conductors for each set of movable elements for transmitting a bit in a code signal indicating the position reached by an element in the set and plurality of signaling-back contacts associated with and controlled by each movable element to be closed or opened, depending on the position of said element, connecting means between one side of each such signaling-back contact and a signaling-back conductor allotted to the set of elements to which the element controlling the contact belongs, a plurality of signaling-back selection lines each allotted to a group of movable elements and connected to the other side of all signaling-back contacts controlled by the movable elements of that group and selectable by said group-selecting means by connecting it to a point of predetermined potential, a common code signal comparison means including an output circuit and a first and a second set of input circuits a separate electronic switch in each signaling-back conductor for connecting the signaling-back conductor to a common connecting circuit allotted to the same bit as the signaling-back conductor and electric connection means between the connecting circuit and the first set of input circuits of the common code signal comparison means, a separate electronic switch for each control circuit for connecting it to the output circuit of the common comparison means, common programming circuits for controlling the electronic switches in the signaling-back circuits related to a certain set of movable elements and the separate electronic switch for the control circuit related to the same set of movable elements, a common data storage means provided with separate locations for storing a code signal designating the desired position of one movable element of a group of such elements to be set simultaneously, a common programming means provided with means for successively selecting the locations in the data storage means and controlling the reading of the code signal stored therein and the transmission of this code signal to the second set of input circuits of the code signal comparison circuit and for applying simultaneously with the selection of a certain location a given voltage to one of the common programming circuits for causing the electronic switches controlled by the said common programming circuit to conduct, means included in the common code signal comparison means for applying, on the establishment of equivalence of the signals applied to the first and the second set of input circuits, a voltage to the output circuit of the common code signal comparison means for switching over the control circuit connected to this output circuit to a condition in which it makes the electronic switch controlled by it suppress the pulse supply to the pulse supply conductor connected thereto, and means for starting the programming means for a complete sequence of operations, during which all locations storing signals are read, in the interval between two successive pulses supplied by the common source.

5. The system of claim 4, wherein said group-selecting means includes a plurality of electromagnetic relays and further comprising a source of slow synchronizing pulses for controlling the setting of said relays and a source of higher frequency synchronizing pulses for controlling the comparisons made by said comparison means.

References Cited by the Examiner

UNITED STATES PATENTS

| | | | |
|---|---|---|---|
| 1,952,513 | 3/1934 | Reynolds | 340—324 |
| 2,264,563 | 12/1941 | Bumstead | 340—324 |
| 2,788,886 | 4/1957 | Paulding et al. | 340—154 |
| 3,011,153 | 11/1961 | Haselton et al. | 340—324 |

FOREIGN PATENTS 719,229   12/1954   Great Britain.

NEIL C. READ, *Primary Examiner.*

P. XIARHOS, *Assistant Examiner.*